US007583634B2

(12) United States Patent
Gillies et al.

(10) Patent No.: US 7,583,634 B2
(45) Date of Patent: Sep. 1, 2009

(54) SYSTEMS AND METHODS FOR PACKET BASED HANDOFF IN WIRELESS COMMUNICATION SYSTEMS

(75) Inventors: Donald Gillies, San Diego, CA (US); Gavin Horn, La Jolla, CA (US); Nikhil Jain, San Diego, CA (US); Parag Agashe, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 227 days.

(21) Appl. No.: 11/142,877

(22) Filed: Jun. 1, 2005

(65) Prior Publication Data

US 2005/0271014 A1 Dec. 8, 2005

Related U.S. Application Data

(60) Provisional application No. 60/576,194, filed on Jun. 1, 2004.

(51) Int. Cl.
*H04Q 7/00* (2006.01)

(52) U.S. Cl. .................... 370/331; 370/351; 370/310.2; 370/392; 370/328; 370/329; 455/436

(58) Field of Classification Search ................. 370/331, 370/351, 310.2, 392, 328, 329; 455/436
See application file for complete search history.

(56) References Cited

U.S. PATENT DOCUMENTS

| 5,872,773 | A | 2/1999 | Katzela et al. | |
|---|---|---|---|---|
| 6,252,862 | B1 | 6/2001 | Sauer et al. | |
| 6,647,001 | B1 | 11/2003 | Bhagavath et al. | |
| 6,674,713 | B1 | 1/2004 | Berg et al. | |
| 6,781,999 | B2 * | 8/2004 | Eyuboglu et al. | 370/399 |
| 6,930,988 | B2 * | 8/2005 | Koodli et al. | 370/331 |
| 6,968,190 | B1 | 11/2005 | Suumaki et al. | |
| 7,069,013 | B2 | 6/2006 | Pedziwiatr et al. | |
| 7,089,009 | B1 | 8/2006 | Fauconnier | |
| 7,151,758 | B2 * | 12/2006 | Kumaki et al. | 370/331 |
| 2002/0018010 | A1 | 2/2002 | Le | |
| 2003/0139183 | A1 | 7/2003 | Rantalainen | |
| 2004/0100951 | A1 * | 5/2004 | O'neill | 370/389 |

FOREIGN PATENT DOCUMENTS

| EP | 03663342 | 10/1989 |
|---|---|---|
| KR | 20010065932 | 7/2001 |
| WO | 01039525 | 5/2001 |
| WO | 03041430 | 5/2003 |
| WO | 03041436 | 5/2003 |

OTHER PUBLICATIONS

International Preliminary Report on Patentability - PCT/US05/019166, International Preliminary Examining Authority - United States Office - Mar. 9, 2007.

(Continued)

*Primary Examiner*—Sanh D Phu
(74) *Attorney, Agent, or Firm*—Dmitry R. Milikovsky; Darren M Simon

(57) ABSTRACT

Systems and methods for providing packet based handoff in wireless communication systems are provided.

12 Claims, 22 Drawing Sheets

OTHER PUBLICATIONS

International Search Report - PCT/US05/019166, International Search Authority - European Patent Office - Rijswijk - Oct. 17, 2005.
Written Opinion - PCT/US05/019166, International Search Authority - European Patent Office - Rijswijk - Oct. 13, 2005.

3GPP2; "CDMA2000 High Rate Packed Data Air Interface Specification" 3GGP2 C.S0024-A Version 1.0, XP-002382113 (Mar. 2004).

* cited by examiner

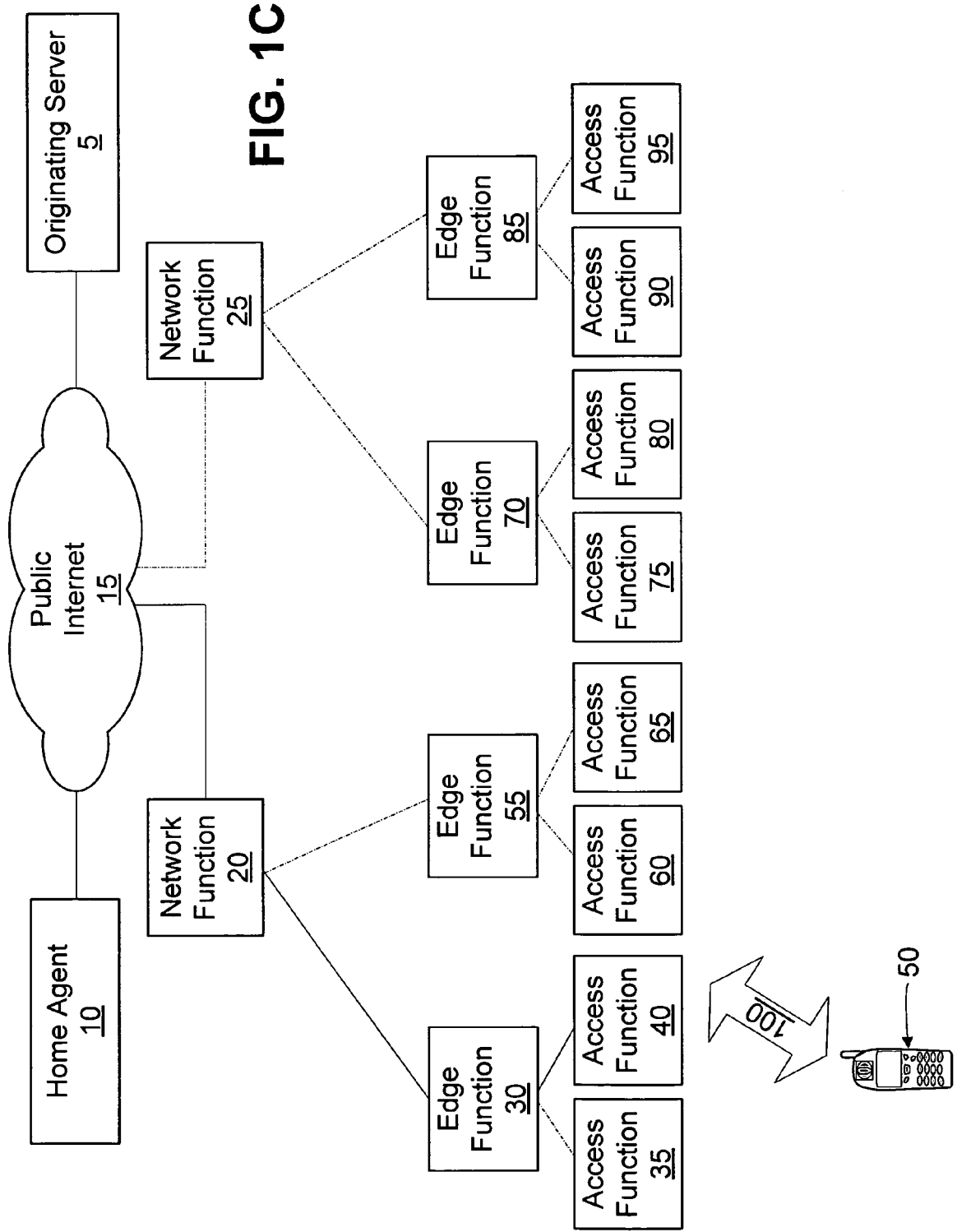

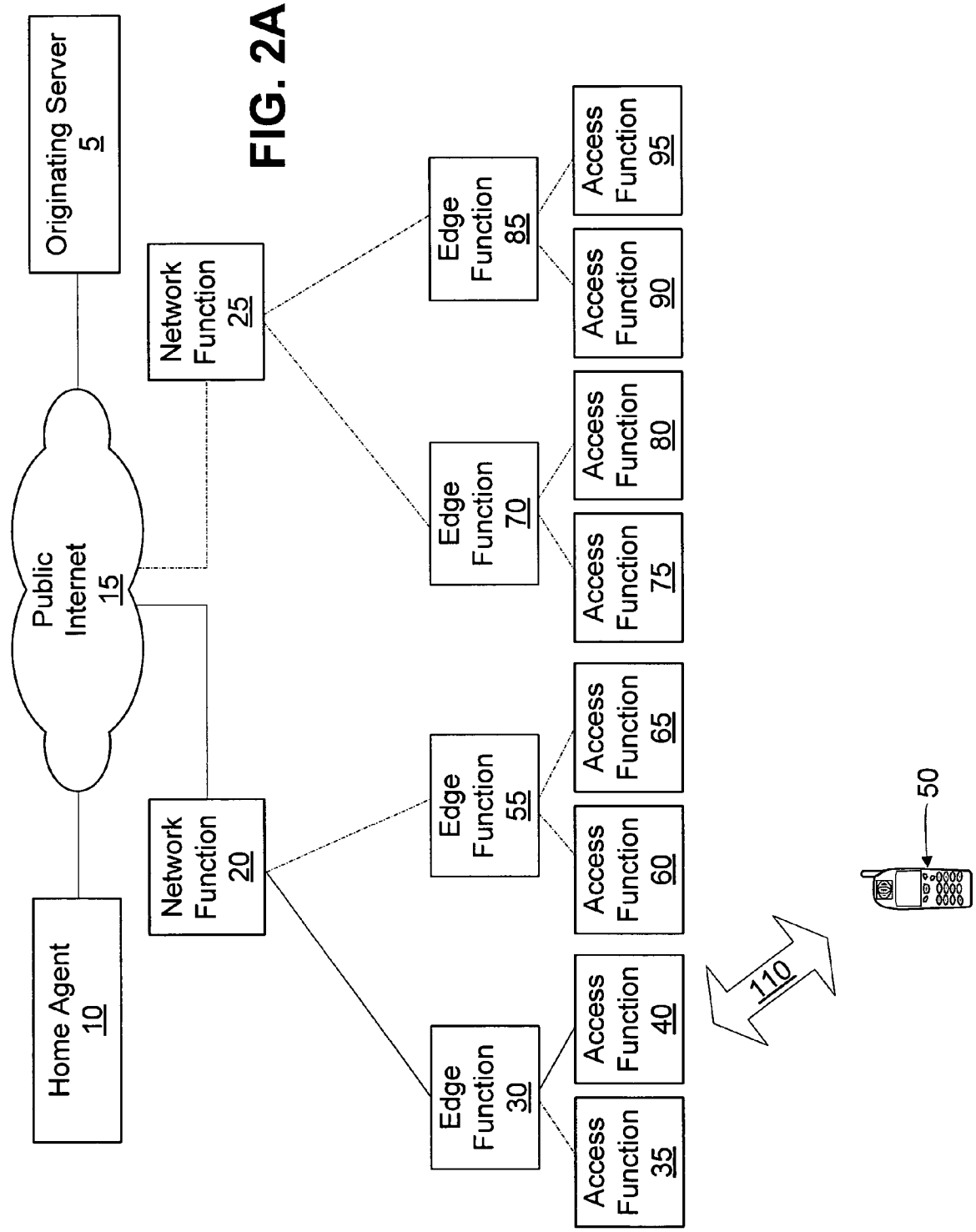

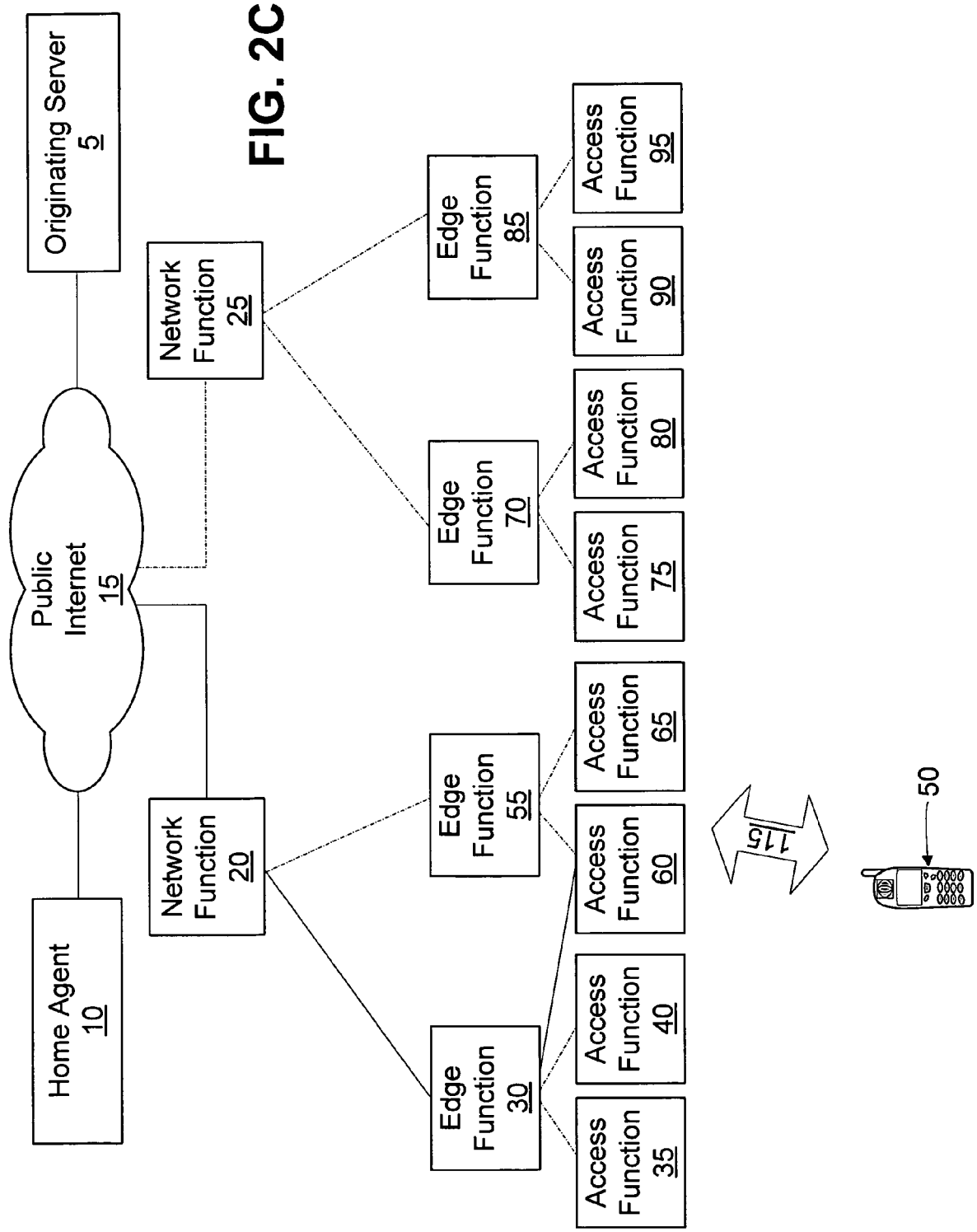

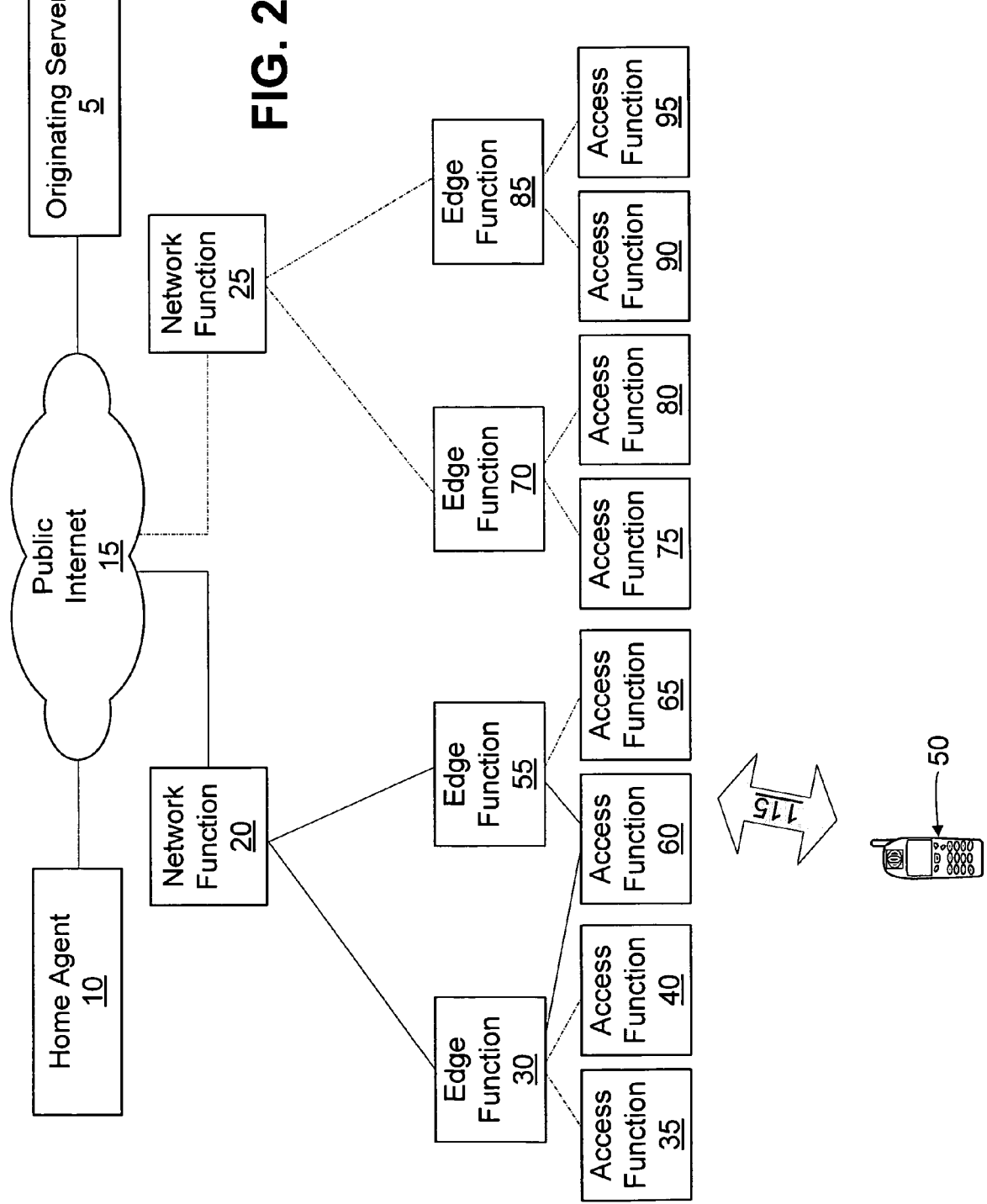

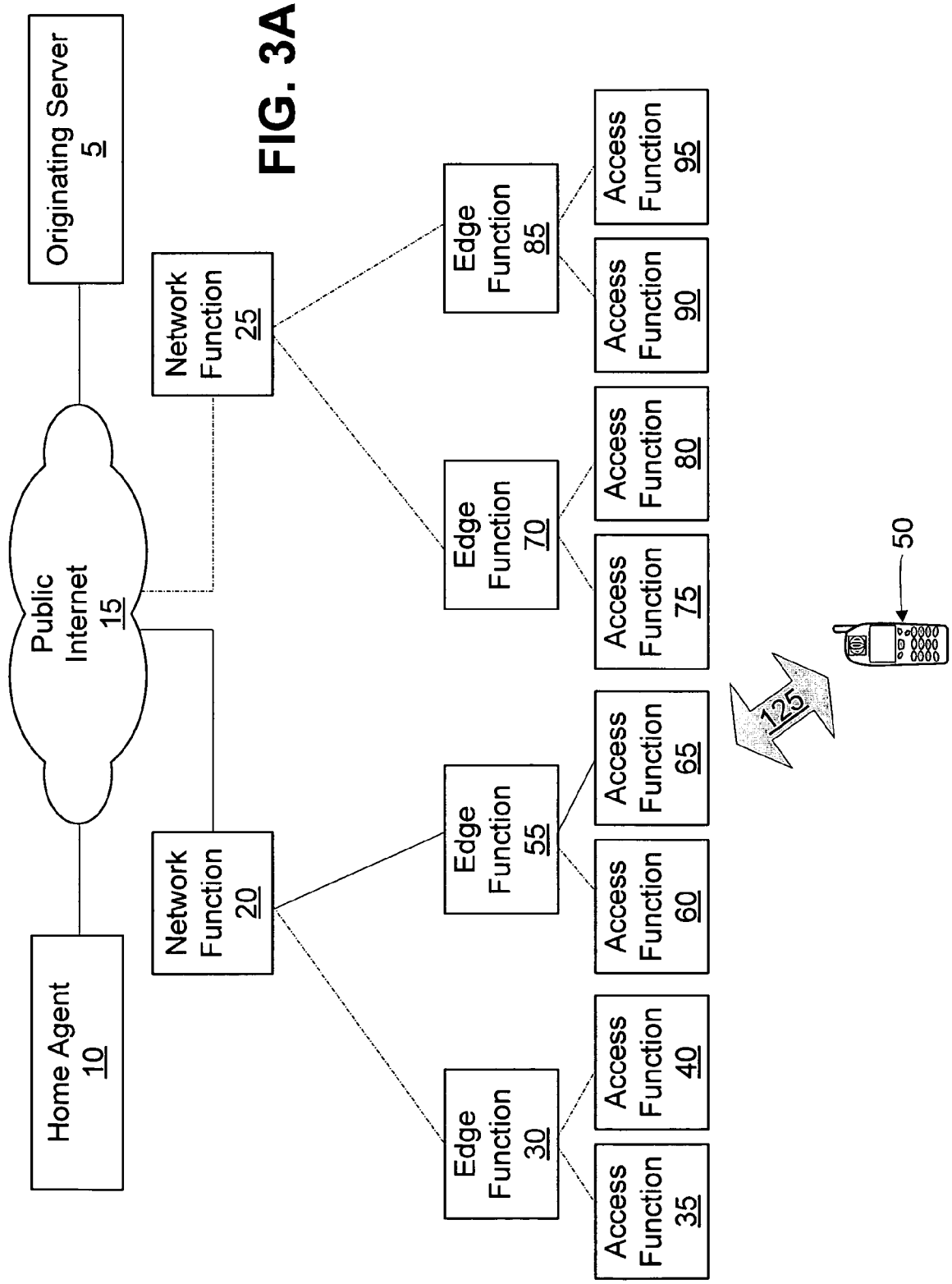

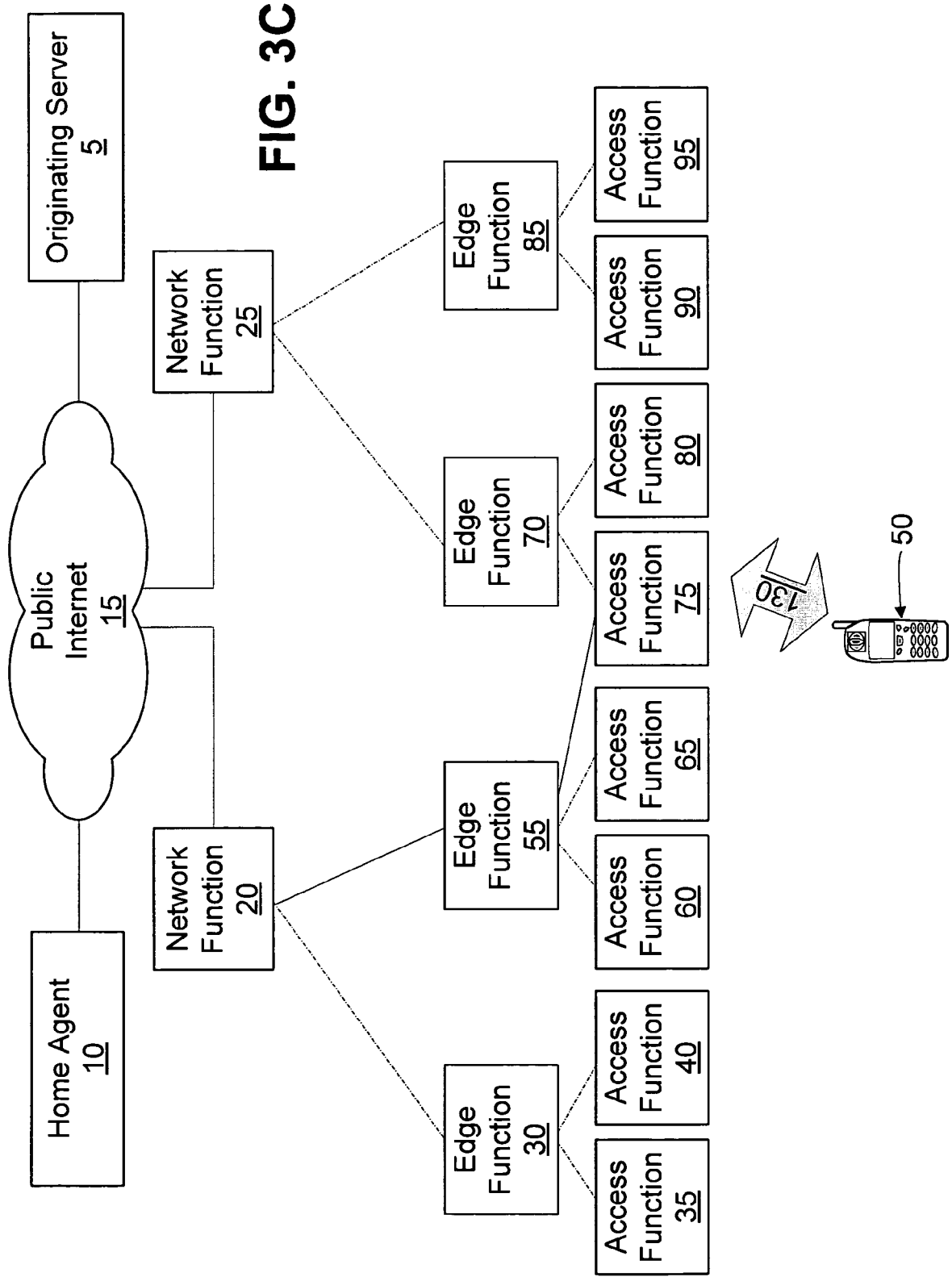

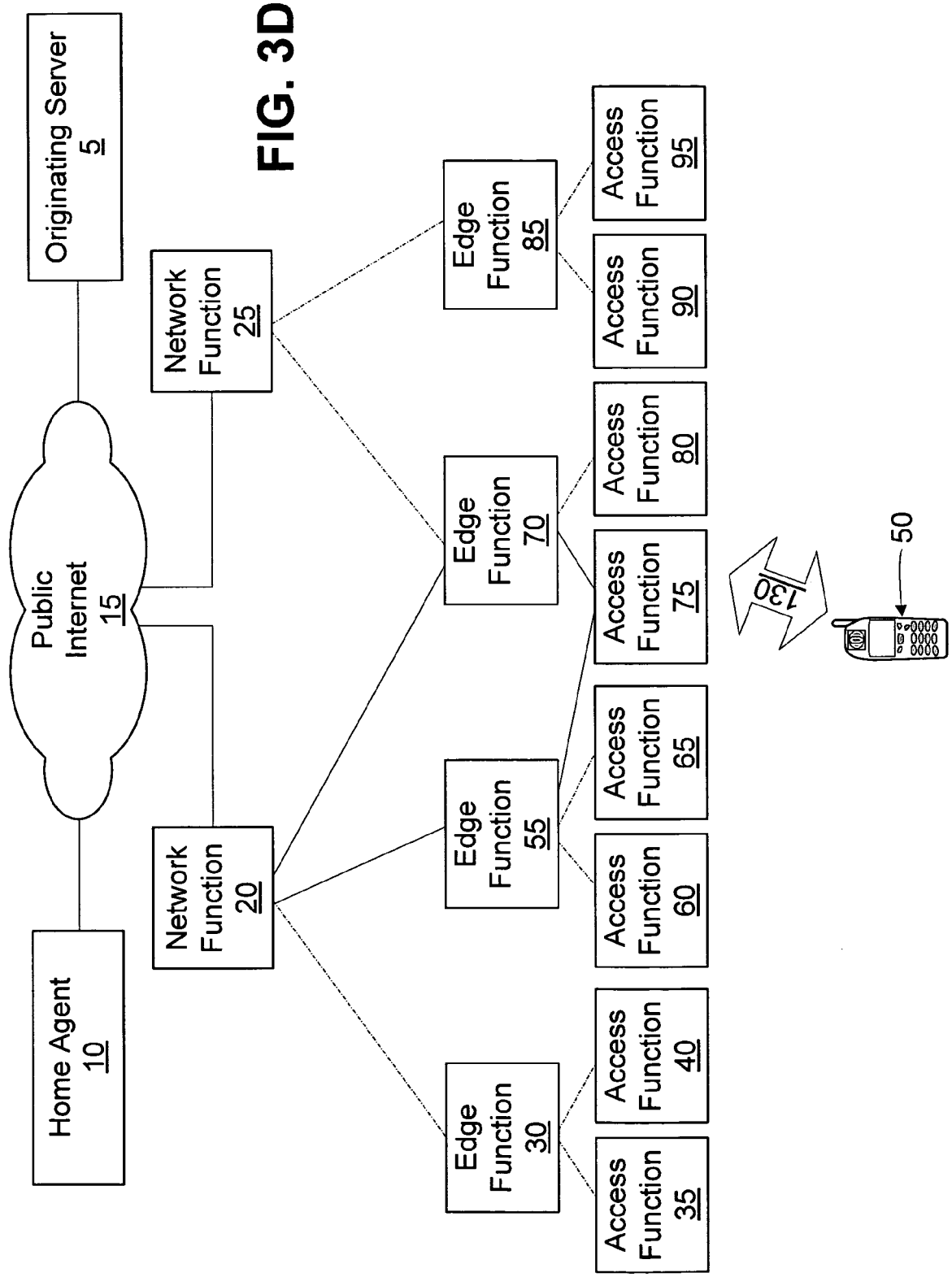

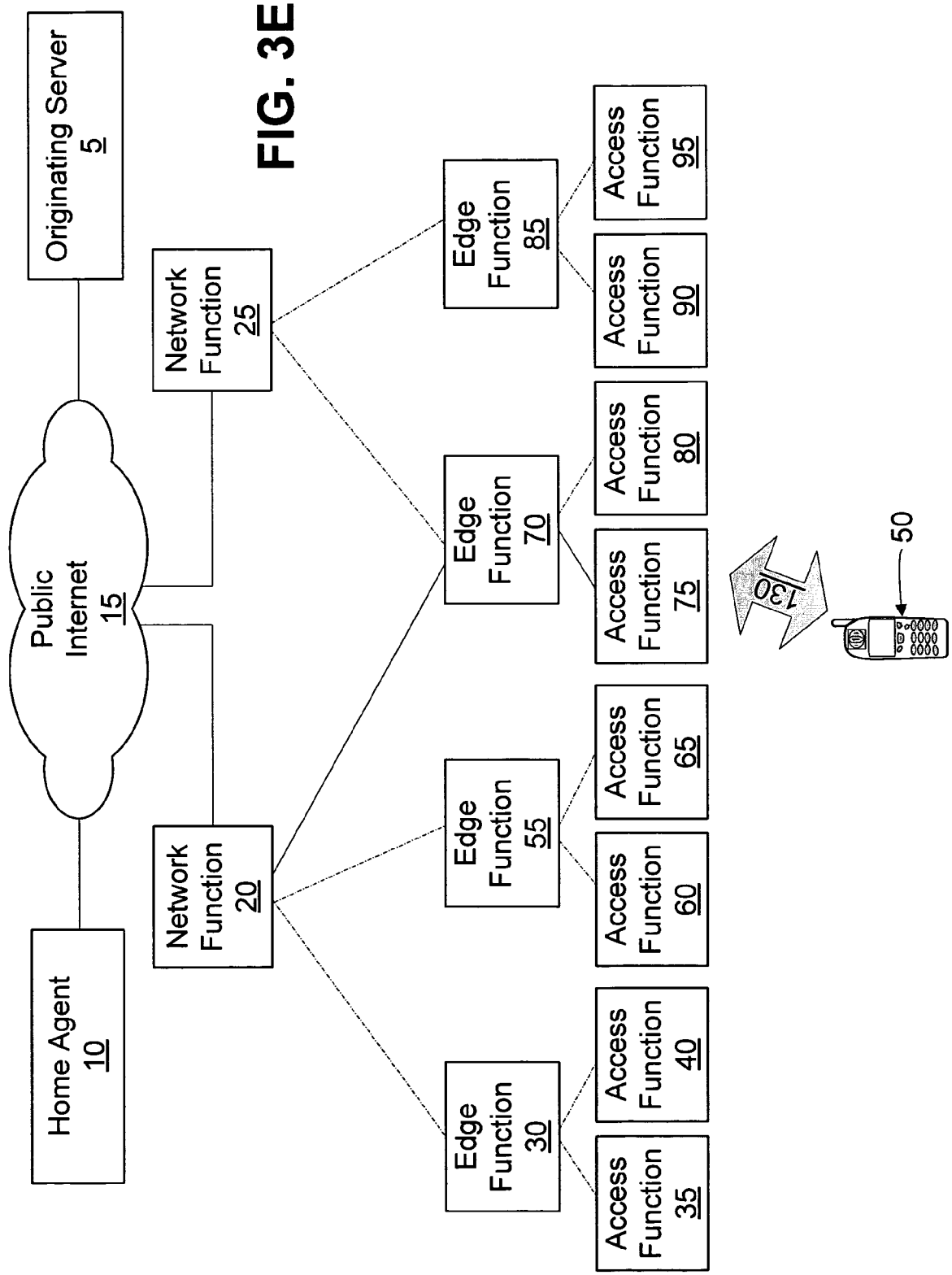

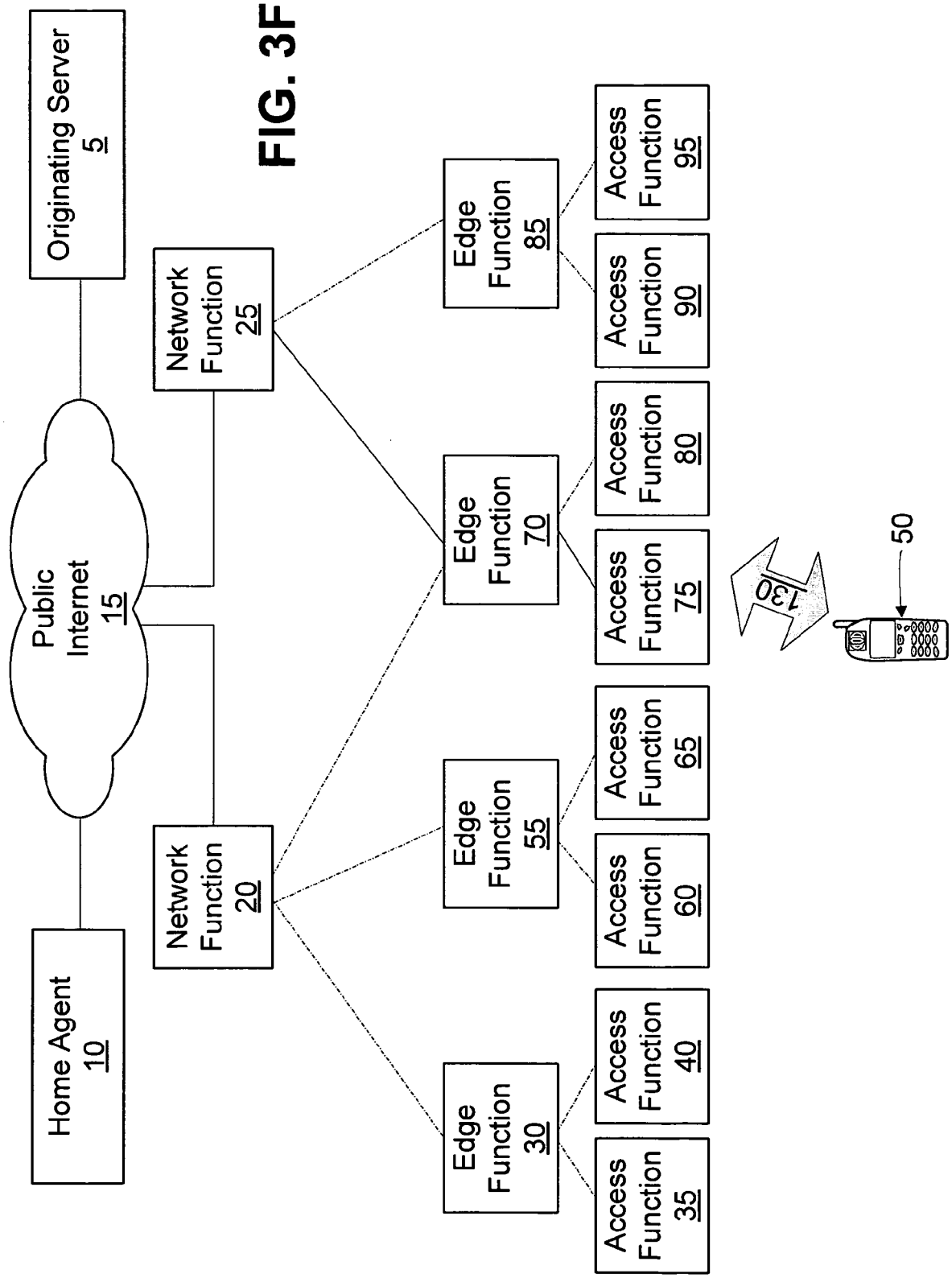

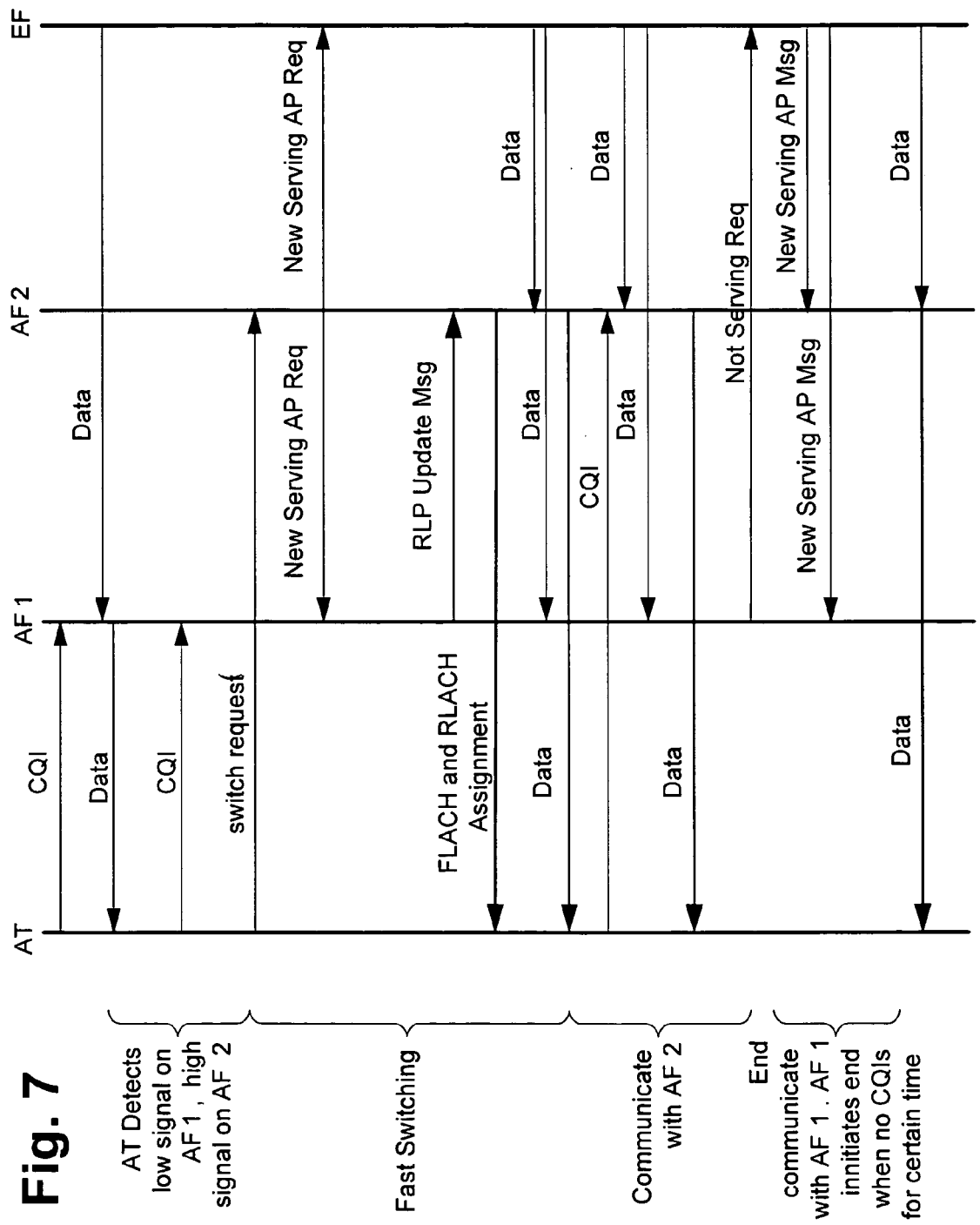

SYSTEMS AND METHODS FOR PACKET BASED HANDOFF IN WIRELESS COMMUNICATION SYSTEMS

CROSS REFERENCE

This application claims priority from Provisional Application No. 60/576,194, filed Jun. 1, 2004, entitled "Radio Network Controller Hand Off" and is assigned to the assignee of the present application, which is incorporated by reference in its entirety.

BACKGROUND

1. Field

The present disclosure relates to communications systems, and amongst other things, to systems and techniques for packet routing in wireless communication systems.

2. Background

Traffic on the Internet is growing exponentially due to an increasing number of subscribers and the introduction of new applications. Wide area wireless networks are also experiencing rapid subscriber growth. Currently, there are many efforts underway to provide data services on wireless access networks.

To facilitate data services in mobile wireless telecommunication systems, it is desirable to allow mobile wireless nodes to change their link-layer point of network attachment without reassigning a new network address. According to current data network telecommunication standards for mobile equipment in general (e.g., the "Mobile IP" standards promulgated by the Internet Engineering Task Force (IETF) or the General Packet Radio Service (GPRS) standards proposed by the European Telecommunication Standards Institute (ETSI)), one way to provide the desired network address transparency is to employ "mobility agents." These are network routing nodes that route communication content on behalf of mobile nodes as they move around the network. For example, according to the IETF Mobile IP standards, a mobile node's mobility agents may consist of a "home agent" routing node and may also include a "foreign agent" routing node. The home agent is a routing node in the mobile node's sub-network that maintains a network interface on the link indicated by the mobile node's "home address," which is a network address intended to remain assigned to the mobile node for an extended time period. When the mobile node is away from its home sub-network, the home agent intercepts communication content bound for the mobile node's home address and tunnels it for delivery to a "care-of" address assigned to the mobile node when the mobile node registers on a foreign sub-network. The care-of address may be the address of a foreign agent routing node in the foreign sub-network.

Correspondent nodes wishing to communicate with a foreign-registered mobile node are able to address their communication content to the mobile node's home address. Transparently, the communication content is intercepted by the home agent and tunneled to the mobile node's care-of address and delivered to the mobile node on the foreign sub-network. Normal routing may be used for sending return communication content from the mobile node to the correspondent node.

The foregoing routing mechanism can be used for mobile wireless nodes connected to a foreign sub-network via an air interface. However, a problem may arise if the mobile wireless node is being actively transported while communicating over the data network and a call handoff is required from one radio base station to another. In that case, the old base station may be linked to one care-of address, while the new base station is linked to another care-of address. Call handoff then requires that the communication tunneling endpoint be transferred from the old care-of address to the new care-of address.

Further, in some cellular telephony architectures a care-of address end point located in the core network is utilized as the addressed communication, e.g. target Internet Protocol Address, for data communication with a wireless communication apparatus or terminal. In some instances, the end point may be a packet data service node (PDSN), a base station controller (BSC) or the like. A handoff between PDSN end points may be required to maintain a minimum level of communications with the mobile wireless node, for instance due to conditions in the core network such as congestion or latency to the mobile wireless node. PDSN handoff then requires that the communication tunneling endpoint be transferred from the care-of address of the old PDSN to the care-of address of the new PDSN.

Transferring the tunneling endpoint of the care-of-address may create gaps that interrupt the timely delivery of call content, or result in out-of-order delivery of content, both of which can degrade communication quality, particularly for voice telephony. Such gaps arise from the inability of the data network to coordinate well with the air interface so as to determine the exact time of handoff. Reorderings can arise when a new tunnel endpoint is significantly closer to the home agent than the old tunnel address. Delay can occur between the point of handoff and the point at which the home agent begins routing communication content to the new care-of address.

Accordingly, there is a need in a data network telecommunication system serving mobile wireless nodes for improved call handoff without loss of communication content. There is a need for systems and methods that route communication content during handoff so that a wireless device does not experience noticeable communication content loss other than that caused by the air interface, if any.

SUMMARY

In an embodiment, a method of transmitting frames to an access terminal comprises identifying a first plurality of frames with a first route identifier identifying a second plurality of frames with a second route identifier, and transmitting the packets over a wireless link according to the route identifier.

In further embodiments, a frame for transmission in a wireless network, includes a portion that identifies a transmission route of the data packet.

In an additional embodiment, a wireless communication device comprises a memory that stores a plurality of frames received at the wireless communication device over a wireless link each including one of a plurality of route identifiers and a processor causing some frames having a same route identifier to be processed together while not processing frames having different route identifiers together with the frames having the same route identifier.

In another embodiment, a device comprises an interface that allows receipt and transmission of frames and a processor causing one of a plurality of route identifiers to be inserted into frames received at the interface and that causes transmission of the frames to one access function of a plurality of access functions, for transmission to access terminals, based upon a route identifier inserted into each frame.

In yet another embodiment, a wireless communication device comprises at least one antenna and a memory that stores a plurality of frames received at the at least one antenna, the plurality of frames and at least two route identifiers. The wireless communication device further comprises a processor causing a first group of the plurality of frames to be identified with a first route identifier of the at least two route identifiers and to be transmitted from the antenna to a first wireless communication apparatus and a second group of the plurality of frames to be identified with a second route identifier of the at least two route identifiers and to be transmitted from the antenna to a second wireless communication apparatus.

It is understood that other aspects of the present disclosure will become readily apparent to those skilled in the art from the following detailed description, wherein is shown and described only exemplary embodiments, simply by way of illustration. As will be realized, the invention is capable of other and different embodiments, and its several details are capable of modifications in various respects, all without departing from the scope of the disclosure. Accordingly, the drawings and description are to be regarded as illustrative in nature, and not as restrictive.

BRIEF DESCRIPTION OF THE DRAWINGS

FIGS. 1A-1C illustrate a system utilizing packet based handoff between access functions according to an embodiment;

FIGS. 2A-2E illustrate a system utilizing packet based handoff between edge functions according to an embodiment;

FIGS. 3A-3F illustrate a system utilizing packet based handoff between network functions according to an embodiment;

FIG. 7 illustrates message flow for a packet based handoff according to an embodiment;

DETAILED DESCRIPTION

The detailed description set forth below in connection with the appended drawings is intended as a description of exemplary embodiments and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well known structures and devices are shown in block diagram form in order to avoid obscuring the concepts of the present invention.

Figure 1A:
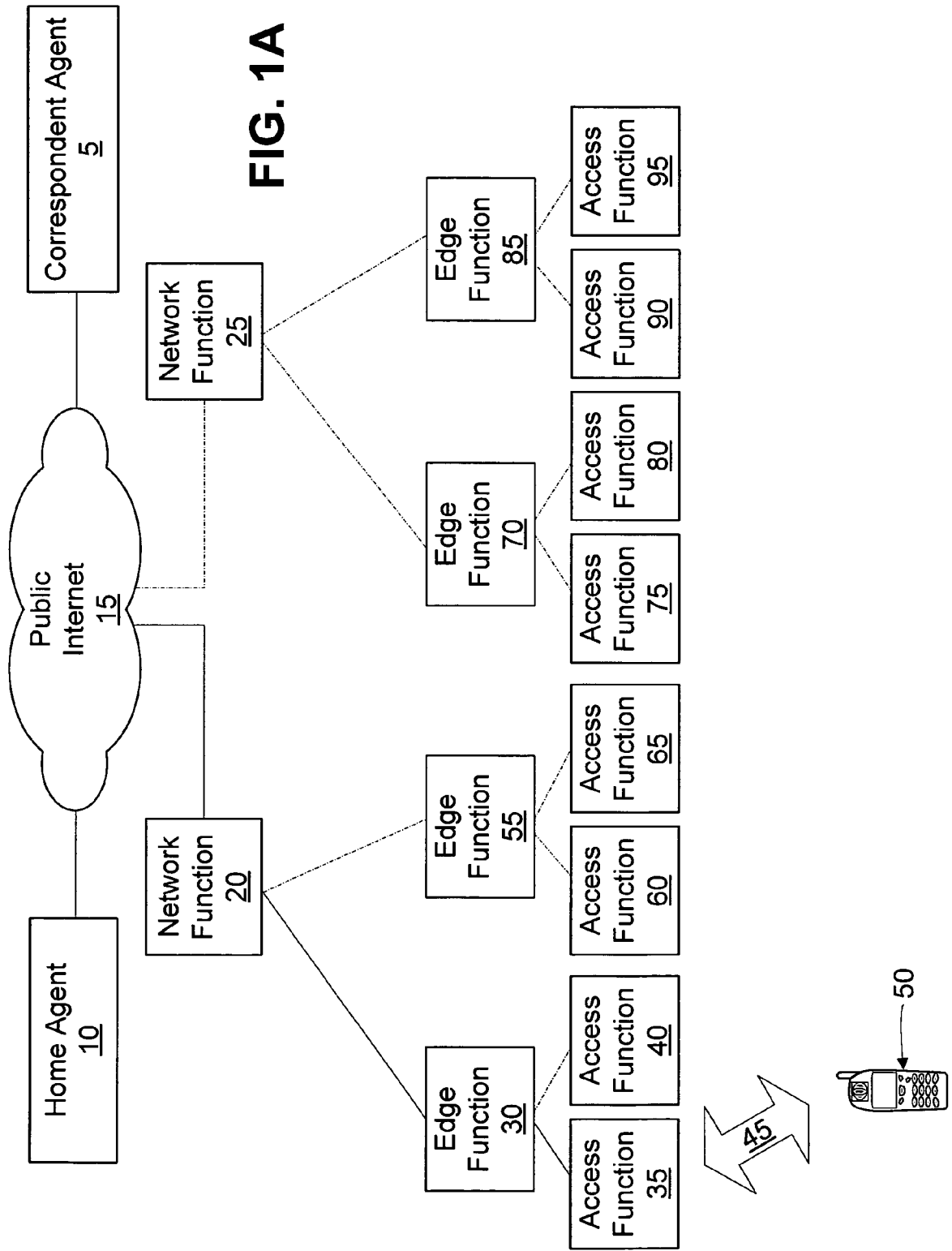
Figure 1B:
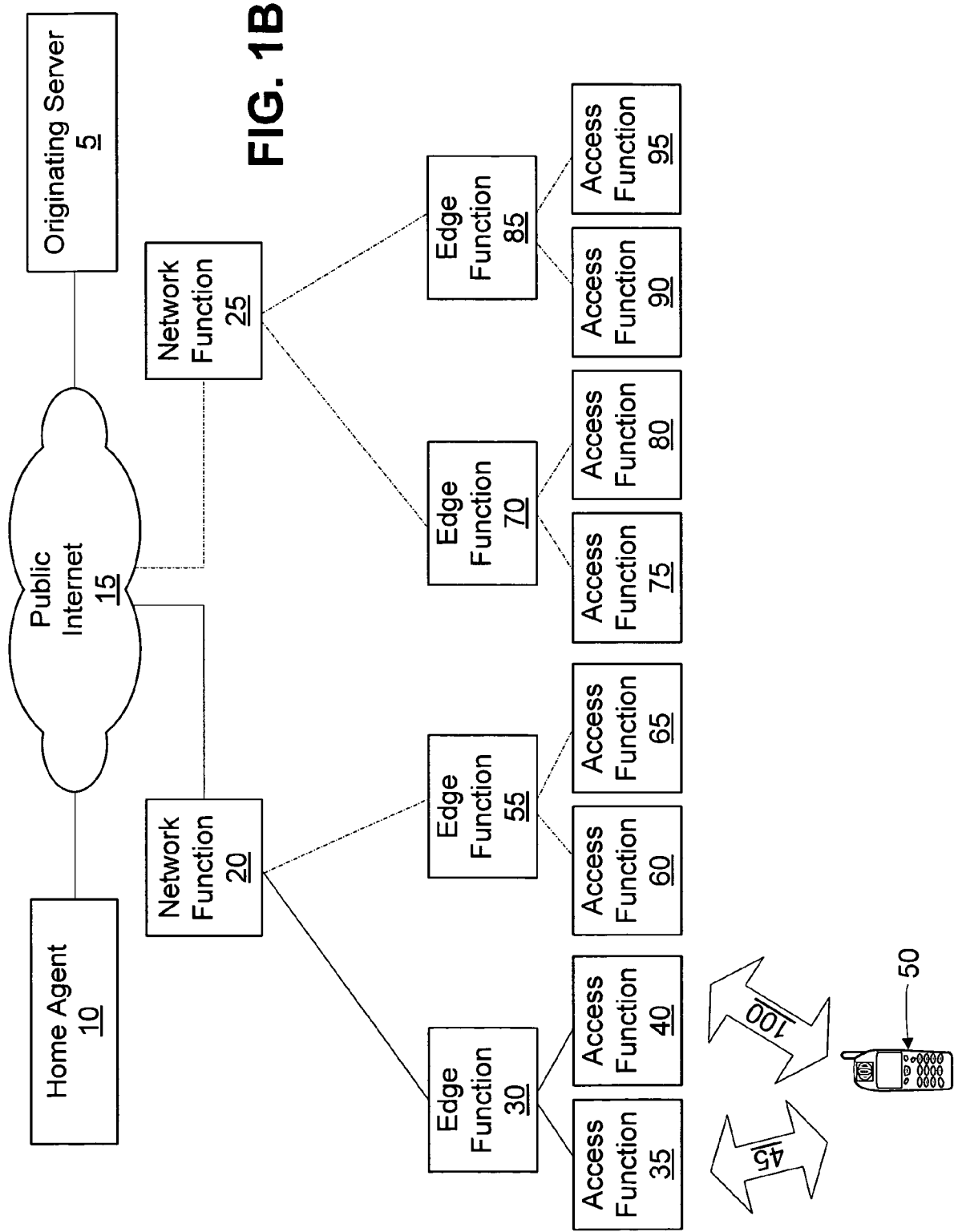

Referring to FIGS. 1A-1C, a system utilizing packet based handoff between access functions according to an embodiment is illustrated. A network function 20 communicates with network 15 and edge functions 30 and 55. In turn, edge function 30 communicates with access functions 35 and 40, while edge function 55 communicates with access functions 60 and 65. Another network function 25 communicates with network 15 and edge functions 70 and 85. In turn, edge function 70 communicates with access functions 75 and 80, while edge function 85 communicates with access functions 90 and 95.

In one embodiment, an access function communication with an edge function is used to indicate the edge function that provides most of the communication between the network, or network function, and the access function. In some embodiments, the edge function that communicates with an access function may be a best edge function in terms of quality of service, throughput, latency, packet loss or the like for that access function to perform the edge functions required to communicate with an access terminal from that access function. For example, referring to FIGS. 1A-1C, edge function 30 communicates with access functions 35 and 40, indicates that edge function 30 is the best edge function for access functions 35 and 40. However, in such embodiments other edge functions may transmit packets between access functions 35 and 40 and the network. In another embodiment, an access function may exclusively communicate with an edge function. In yet another embodiment, an access function and edge function may be single device and communication would be as signals within that device.

In one embodiment, an edge function communication with a network function is used to indicate the network function that provides most of the communication between the network, or network function, and the edge function. In some embodiments, the network function that communicates with an edge function may be a best network function in terms of quality of service, throughput, latency, packet loss and the like for that edge function to perform the network functions required to communicate with an access terminal from that edge function. For example, network function 20 communicates with edge functions 30 and 55, indicates that network function 20 is the best network function for edge functions 30 and 55. However, in such embodiments other network functions may transmit packets between edge functions 30 and 55 and the network. In another embodiment, an edge function may exclusively communicate with a network function. In yet another embodiment, a network function and edge function may be single device and communication would be as signals within that device.

In one embodiment, device 5 transmits packets including the home address of access terminal 50. This home address is utilized by network 15 to forward the packets to home agent 10. Home agent 10, which may know the location of access terminal 50 through any one of various techniques, forwards the packets for over the air transmission to access terminal 50. In one embodiment, the home agent 10 forwards the packets to the edge function 30 which is the care-of address for the access terminal 50. The edge function 30 forwards the packets to access functions 35 and/or 40 for over the air transmission to access terminal 50.

To communicate with access terminal 50, device 5 transmits packets to home agent 10, which then forwards the packets via network 15, network function 20, and edge function 30 to access function 35. Access function 35 then transmits the packets, according to an air interface, over wireless link 45 to access terminal 50. In the reverse direction, packets are transmitted over wireless link 45 to access function 35, which then routes the packets via network 15, network function 20, and edge function, 30 to either home agent 10, which then forwards them to device 5, or directly to device 5.

Access terminal 50 may move from the area serviced by access function 35 to the area serviced by access function 40. At some point during this motion, for example when access terminal 50 approaches a boundary between the area serviced by access function 35 and the area serviced by access function 40, a request can be transmitted for handoff for access terminal 50. In some embodiments, soft handoff functionality may be provided for over the air transmission between access terminal 50 and access functions 35 and 40 during a portion of the handoff procedure.

When handoff is initiated, access terminal 50 can receive packets from and transmit packets to access function 35 and access function 40 over wireless links 45 and 100, respectively. In response to such a request, wireless links 45 and 100 may both be active for an overlapping period of time. In an embodiment, the request may be made by the access terminal and other embodiments the request may be made by the access function that is in communication with the access terminal. In further embodiments, the edge function may request handoff. This may be done when multiple access functions that are controlled or in communication with an edge function allocate resources to the access terminal. In this way, the edge function may have the wireless link characteristic measurements, e.g. channel quality information (CQI), for multiple access functions to determine when handoff should be initiated.

After receipt of the request, some of the packets intended for receipt by access terminal 50 are forwarded by edge function 30 to access function 35 and some of them are forwarded to access function 40 (FIG. 1B). After a period of time, packets are no longer forwarded from edge function 30 to access function 35, and wireless link 45 is closed (FIG. 1C). After wireless link 45 is closed, the communication path with access terminal 50 is between access function 40 via wireless link 100.

In order to facilitate proper processing of packets transmitted via wireless link 45 and packets transmitted via wireless link 100, at the access terminal 50, packets that are transmitted from both access function 35 and access function 40 include a route identifier. In an embodiment, edge function 30 inserts the route identifiers into packets, and then forwards those packets to the access functions 35 or 40 according to the route identifier. In an embodiment, the different route identifier may be inserted into the header of the packet, frame, octet, or other transmission segment or segments used by the communication system. For clarity in the following description, a frame is used to describe an octet, a frame, a packet, or some other transmission segment or segments that are used by the communication system. The term frame may be used to mean any self-identifying group of bits that may be utilized in a communication system.

The frames that are identified with the same route identifier are processed together and those frames having a different route identifier are not processed with these frames. The processing of the frames may include reassembly, header decompression, duplicate detection, in-order packet delivery to the higher layers, decryption, packet discarding (e.g., due to packet latency, partial packet loss, or handoff), or the like.

The use of route identifiers allows for multiple wireless link instances from different routes to simultaneously exist at a single access terminal. Further, it allows a simplified handoff schema to be available regardless of the network device being used for handoff. Handoff is simplified because a new route may be created to achieve handoff, rather than having to teleport existing protocol state. In one embodiment, the route identifier is inserted by the edge function, network function, etc.

In an embodiment, packets are transmitted via a wireless link in the form of frames according to a Radio Link Protocol (RLP). In some embodiments, the RLP supports fragmentation of the higher layer packets for transmission and reassembly of the packets at the receiver, e.g. access terminal 50. The RLP transmitter, e.g. access functions 35 or 40, may perform fragmentation, ordering, and the like for the packets. In an embodiment, fragmentation may be provided by adding an RLP header that includes sequencing information. The RLP receiver then performs reassembly based on the sequencing information received. In some embodiments, the RLP may support multiple frame sizes and may be aware of higher layer packet boundaries. The data unit for an RLP may be either octets or another RLP frame payload. In some embodiments, the RLP frame header describes the contents of the RLP frame payload either using an octet based sequence number or an RLP frame payload number.

An edge function may be any combination of functionality, regardless of physical locations, that allows receipt of packets of one or more protocols and transmission of the packets, or information contained therein, to one or more access functions or other functionality for transmission over a wireless link. An access function may be any combination of functionality, regardless of physical locations, that allows communication over a wireless link with an access terminal. An access terminal may be any functionality that allows for communication over a wireless link. A network function may be any communication point between a number of devices and/or functions and a network, e.g. a router.

Figure 2B:
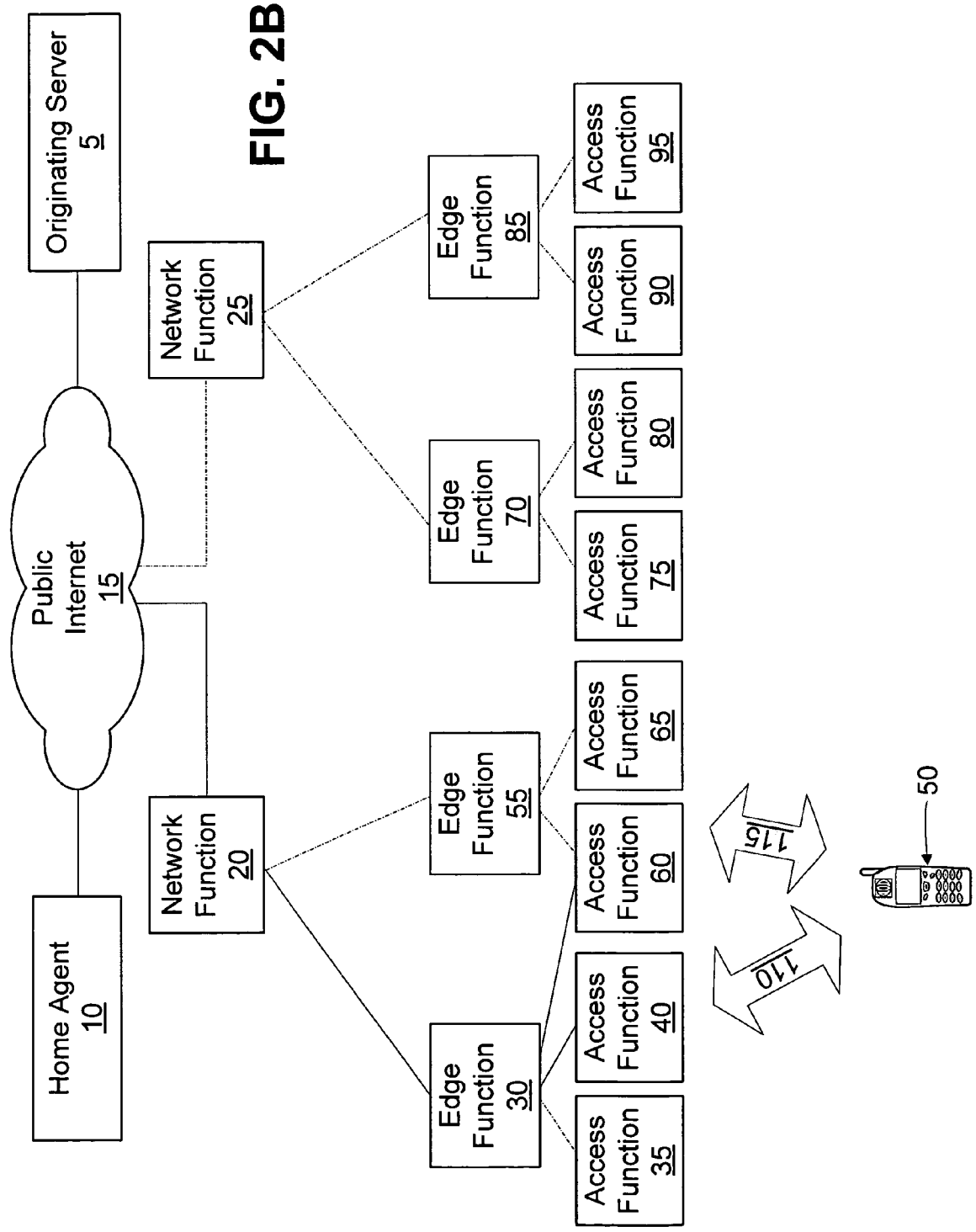

Referring to FIGS. 2A-2E, a system utilizing packet based handoff between edge functions according to an embodiment is illustrated. In FIG. 2A, access terminal 50 is first in communication with access function 40 via wireless link 110. Access function 40 is in communication with edge function 30, which in turn is in communication with network 15, via network function 20. This allows communication between access terminal 50 and home agent 10 and device 5.

Access terminal 50 may move from the area serviced by access function 40 to the area serviced by access function 60. At some point during this motion, for example when access terminal 50 approaches a boundary between the area serviced by access function 40 and the area serviced by access function 60, a request can be transmitted for handoff for access terminal 50. When handoff is initiated, access terminal 50 can receive packets from and transmit packets to access function 40 and access function 60 over wireless links 110 and 115, respectively (FIG. 2B). Since edge function 30 and access function 60 are not in regular communication, i.e. edge function 30 does not serve as an interface to the network for access function 60, edge function 30 needs to forward packets to access function 60 (FIG. 2B). In an embodiment, this may be done directly via network 15 or may be done by first forwarding the packets to edge function 55 via network 15.

Wireless links 110 and 115 may both be active for an overlapping period of time. After the time period, wireless link 110 is closed and access function 40 releases any resources that were utilized for communication with access terminal 50. After wireless link 110 is closed, a communication path between network function 20, edge function 30, and access function 60 for the transmission of packets to access terminal 50 exists (FIG. 2C). At this point, a handoff between edge function 30 and edge function 55 for communication with access terminal 50 via access function 60 may be performed. The edge function handoff generally includes the formation of a communication path between network function 20 and edge function 55, and between edge function 55 and access function 60 (FIG. 2D).

Figure 2E:
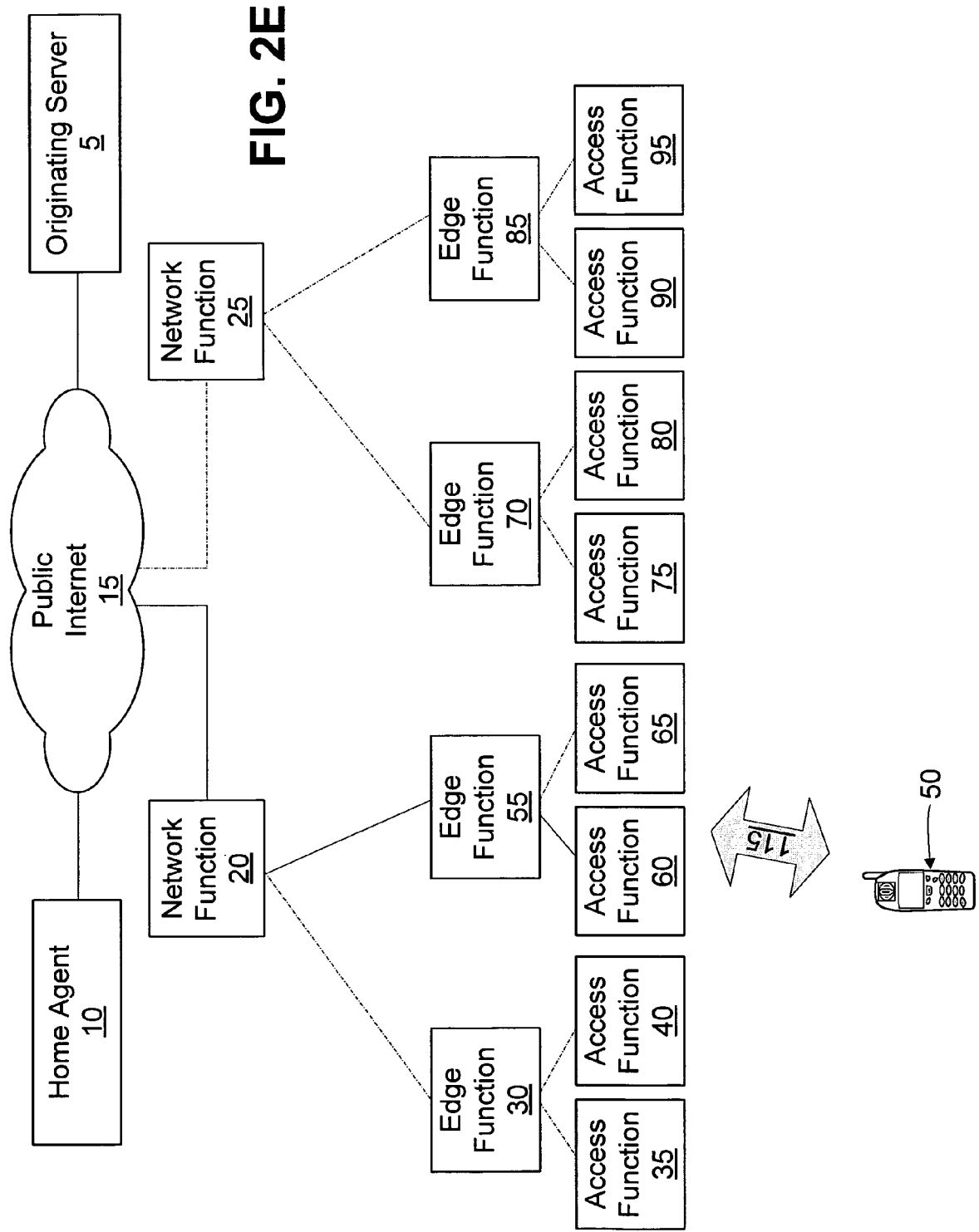

After, formation of the communication path between network function 20 and access function 60, via edge function 55, packets intended for access terminal 50 are no longer forwarded from network function 20 to edge function 30. Any packets previously queued in edge function 30, intended for access terminal 50, are forwarded to either edge function 55, for transmission to access function 60, or directly to access function 60 (FIG. 2D). Once this is complete, communication between edge function 30 and access function 60 is terminated and the communication path between network 15 and access terminal 50 is via access function 60, edge function 55, and network function 20. (FIG. 2E).

It should be noted that the operation of edge function 30 and edge function 55 are independent of each other. That is, once communication is established between edge function 55 and access function 60, there is no need for signaling or communication between edge function 30 and edge function 55. In some embodiments, some state information need not be transferred between edge function 30 and edge function 55. For example, quality of service (QoS) requirements, cryptographic keys, and other slow changing link control state may be transferred between edge function 30 and edge function 55, while fast changing buffer contents and state as well as header compression state may be independently generated at each of edge function 30 and edge function 55. In further embodiments, edge function 30 continues communication with access function 60 while edge function 55 is setting up communication with access function 60. For example, any packets that arrive at edge function 30 after edge function 55 has set up may still be processed by edge function 30 and forwarded to access terminal 50.

As discussed with respect to FIGS. 1A-1C, a route identifier is inserted into packets by edge function 30 and edge function 55. The route identifier may identify the edge function which processed the packets transmitted to access terminal 50. The packets or portions of packets that are identified with the route identifier of edge function 30 are processed together at access terminal 50, while those that are identified with the route identifier of edge function 55 are processed together at access terminal 50. However, those packets having the route identifier of the edge function 30 are not processed with the packets having the route identifier of edge function 55 at access terminal 50.

As discussed with respect to FIGS. 1A-1C, in an embodiment, the request for handoff may be made by the access terminal and in other embodiments the request may be made by the access function that is in communication with the access terminal. In addition, the edge function may request handoff due to its own processing of communication channel estimates, e.g. channel quality information, generated by the access terminal or access function, due to location information for access terminal 50, or other approaches.

In the embodiments of FIGS. 1A-1C and 2A-2E, network functions 20 and 25 need not be utilized and edge functions 30, 55, 70, and 85 may be in direct communication with network 15.

Figure 3B:
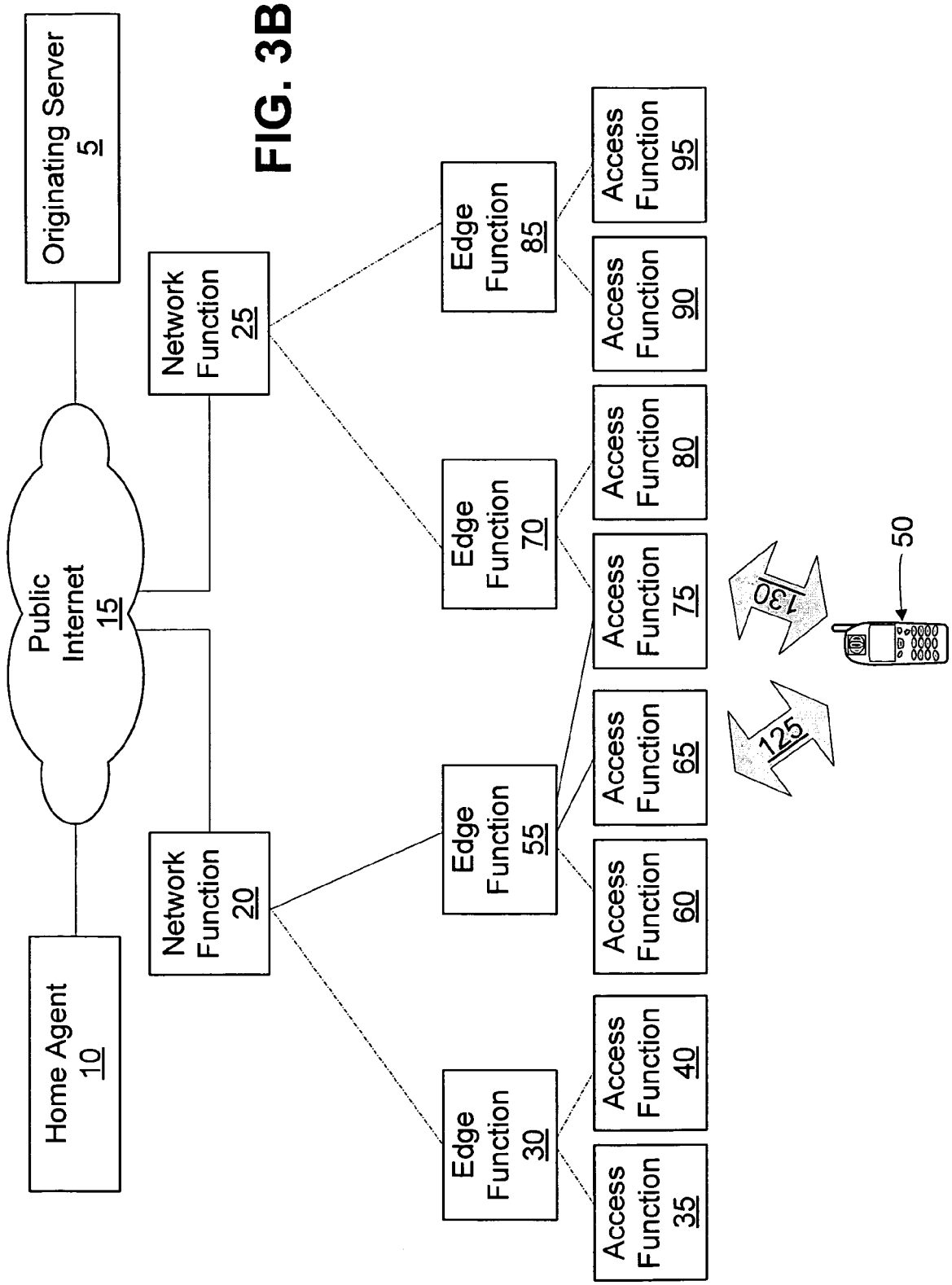

Referring to FIGS. 3A-3F, a system utilizing packet based handoff between network functions according to an embodiment is illustrated. In FIGS. 3A-3F, access terminal 50 is first in communication with access function 65 via wireless link 125. Access function 65 is in communication with edge function 55, which in turn is in communication with network 15, via network function 20. (FIG. 3A). This allows communication between access terminal 50 and home agent 10 and device 5.

Access terminal 50 may move from the area serviced by access function 65 to the area serviced by access function 75. Access function 75 is in communication with edge function 70, which in turn is in communication with network function 25, thus allowing access function 75 to be in communication with network 15.

At some point during the motion, for example when access terminal 50 approaches a boundary between the area serviced by access function 65 and the area serviced by access function 75, a request can be transmitted for handoff for access terminal 50. When handoff is initiated, access terminal 50 can receive packets from, and transmit packets to, access function 65 and access function 75 over wireless links 125 and 130, respectively. (FIG. 3B). In FIGS. 3A-3F, network function 20 and edge function 70 are not in regular communication, i.e. edge function 70 is not coupled to the network via network function 25. Therefore, edge function 55 needs to forward packets to access function 75. In an embodiment, this may be done directly or may be done by first forwarding the packets to edge function 70 from edge function 55 via the network, using network functions 20 and 25.

During the handoff procedure in this case, the communication path between access function 65 and edge function 55 is terminated, thereby terminating wireless link 125. (FIG. 3C). As such, access function 65 releases any resources that were utilized for communication with access terminal 50. After wireless link 125 is closed, a communication path between network function 20, edge function 55, and access function 75 for the transmission of packets to access terminal 50 is present. (FIG. 3C). While this communication path is being formed, a communication path between network function 20 and access function 75, via edge function 70 is created. (FIG. 3D).

After, formation of the communication path between network function 20 and access function 75, via edge function 70, packets intended for access terminal 50 are no longer transmitted from network function 20 to edge function 55. (FIG. 3D). This allows for the communication between edge function 55 and access function 75 to be terminated. (FIG. 3D). Any packets queued in edge function 55, intended for access terminal 50, are transmitted to either edge function 70, for transmission to access function 75, or directly to access function 75. Once this is complete, communication between edge function 55 and access function 75 is terminated and the communication path between network 15 and access terminal 50 is via access function 75, edge function 70, and network function 20.

To further complete the network function handoff a path is created between network function 25 and edge function 70 and the path between network function 20 and edge function 70 is terminated. (FIG. 3F).

In another embodiment, the network function handoff and the edge function handoff are coupled as a single handoff, such that the new network function and edge function paths are created and activated together. In yet another embodiment, the network function handoff occurs due to an edge function or access function handoff, in that the edge function or access function associated with that network function require a path from that network function in order to receive or forward packets to the access terminal.

As discussed with respect to FIGS. 1A-1C and FIGS. 2A-E, a route identifier is inserted into packets by edge function 55. The route identifier may identify the access terminal 50, access function 65 or access function 75, which will be transmitting frames, over a wireless link to access terminal 50. The frames that are identified with the route identifier of access function 65 are processed together, while those that are identified with the route identifier of access function 75 are processed together. However, those frames having the route identifier of the access function 65 are not processed with the frames having the route identifier of access function 75.

In addition, the route identifier may identify the edge function that is transmitting the packets to the access function that is in communication, via a wireless link, with the access terminal. The route identifier that includes the edge function that forwards the packets may be utilized by the access terminal to reassemble packets together that have the same route identifiers, i.e. that those originate from the same edge function/access function pairs, while not reassembling those packets that have different route identifiers together. Additionally, or alternatively, the route identifier that includes an identification of the edge function may be used by the access functions to properly control communication instances with respect to multiple edge functions.

Further, the route identifier may identify the network function, e.g. network function 20 or 25 that is transmitting packets to and from the network. The information related to the network function 20 or 25 may be used by the edge functions to facilitate communication with the network and to create communication routes and for predictive handoff between access functions.

In the embodiments of FIGS. 1A-1C, 2A-2E, and 3A-3F, the route identifier is utilized to identify an intermediate point or points along the transmission route between network 15 and access terminal 50. As described in the above embodiments, these may be access functions, edge functions, or network functions or any combinations thereof.

As discussed with respect to FIGS. 1A-1C and 2A-2E, in an embodiment, the request for handoff may be made by the access terminal and in other embodiments the request may be made by the access function that is in communication with the access terminal. In further embodiments, the request for handoff may be made by the edge function that is in communication with the access terminal. For the purposes of handoff, in communication may mean any device that allocates resources, including CQI generation or measurement for a particular access terminal.

If a handoff is required between access functions, then the edge function that is in communication with the network can transmit packets to multiple access functions, which communicate with a same access terminal, seamlessly by inserting the route identifier into the packets and then transmitting them to the appropriate access functions for transmission to the access terminal. This also applies to handoffs between edge functions and network functions, since the route identifier can identify one or multiple functions and thereby provide a traceable path that may be used on the reverse link.

As used with respect to FIGS. 1-3, an access function may be a fixed station used for communicating with the terminals and may also be referred to as, and include some or all the functionality of, a base station, base station transceiver, a Node B, or the like. An access terminal may also be referred to as, and include some or all the functionality of, a mobile station, a user equipment (UE), a wireless communication device, terminal, or the like. A mobile station may also be referred to as, and include some or all the functionality of, a mobile station, a user equipment (UE), a wireless communication device, terminal, access terminal or some other terminology. An edge function may also be referred to as, and include some or all of the functionality of, a base station controller (BSC), radio network controller (RNC), or the like.

A network function may also be referred to as, and include some or all of the functionality of, a PDSN, General Packet Radio Service Support Node (GSN), Gateway General Packet Radio Service Support Node (GGSN), or the like.

Figure 4:
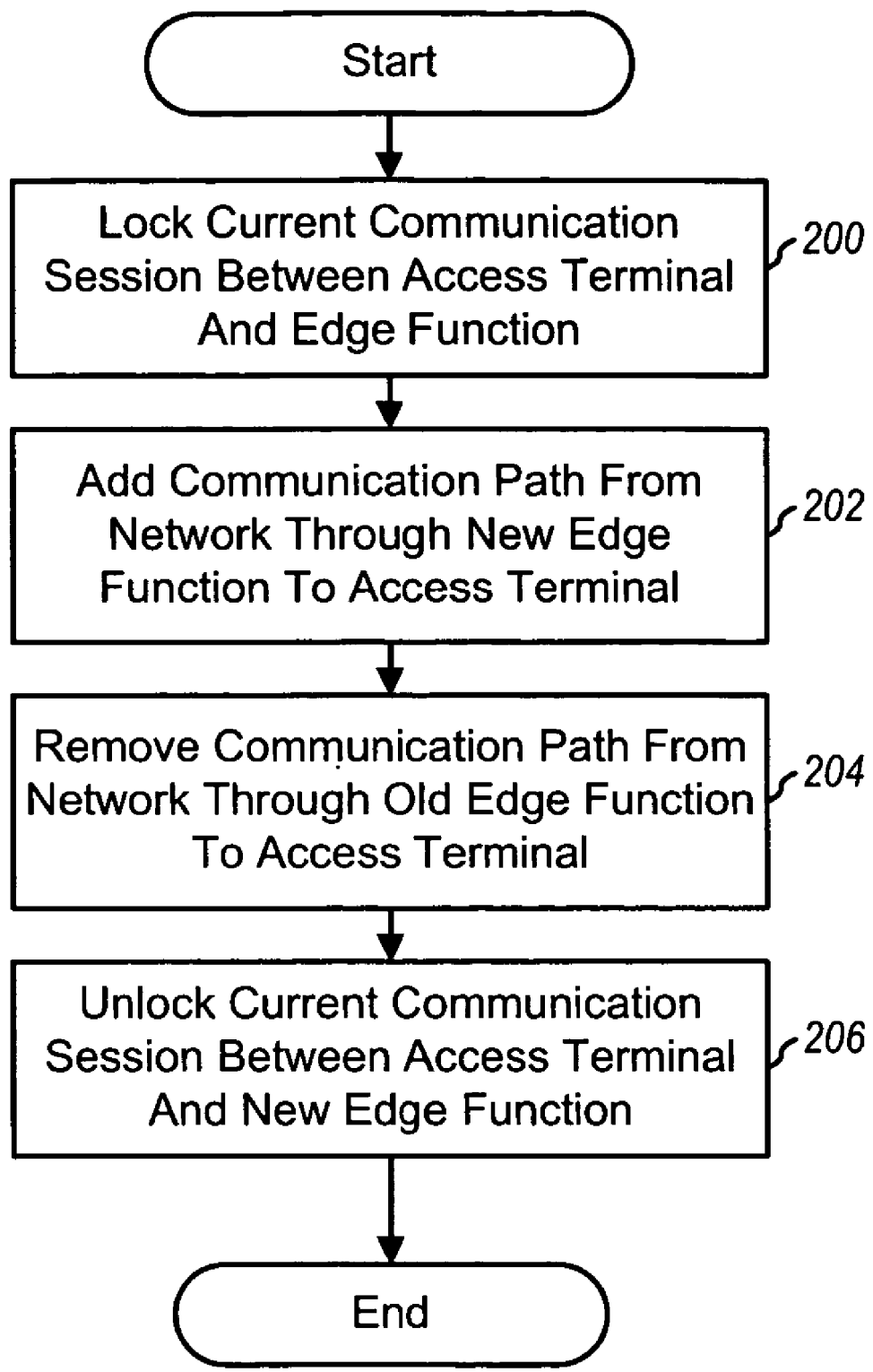
FIG. 4 illustrates an operational flow of packet based edge function handoff between edge functions according to an embodiment.

Referring to FIG. 4, an operational flow of packet based edge function handoff according to an embodiment is illustrated. Once a request to provide a handoff is provided, the session between the access terminal and the access function with which it is currently communicating is locked at the edge function, block 200. As described previously a request for handoff may occur in multiple ways. For example, an edge function may decide to become a new edge function for an access terminal. In this case the new edge function performs discovery functions as to the old edge function to obtain session attributes, e.g. access terminal capabilities and setup parameters. It can then lock the session and send a binding update message to the home agent to switch edge functions. Locking a session may include allowing ongoing session configurations and attribute updates to continue, but preventing new session configurations or attribute updates from being initiated for the access terminal at issue.

After locking of the session, a new communication path is formed between the network and a new edge function, for communication with the access terminal block 202. In forming the new communication path, the old edge function may send a delta of the changes to new edge function. The delta of changes may provide session information with respect to changes since the new edge function transmitted its request to the home agent. The new path, generally formed at the RLP, allows for packets to be routed from the network to the new edge function, which can then be processed and transmitted over the air to the access terminal. In another embodiment, the new communication path is set up in stages such that some attributes or resources of the path are set up before the binding update while others are delayed until the binding update completes successfully.

After the new path is established, packets may still be received by the old edge function. However, after some period of time a request may be made to cease transmission of packets intended for the access terminal from the old edge function. At this time, the communication path in the old edge function is removed, block 204. The communication path may be removed by deleting all of the resources, including buffer and state information, from the appropriate memory of the old edge function.

The session is then unlocked and communication proceeds between the new edge function and the access terminal, block 206. Unlocking may allow for new session configurations or attribute updates to be formed for communication with the particular access terminal.

Figure 5:
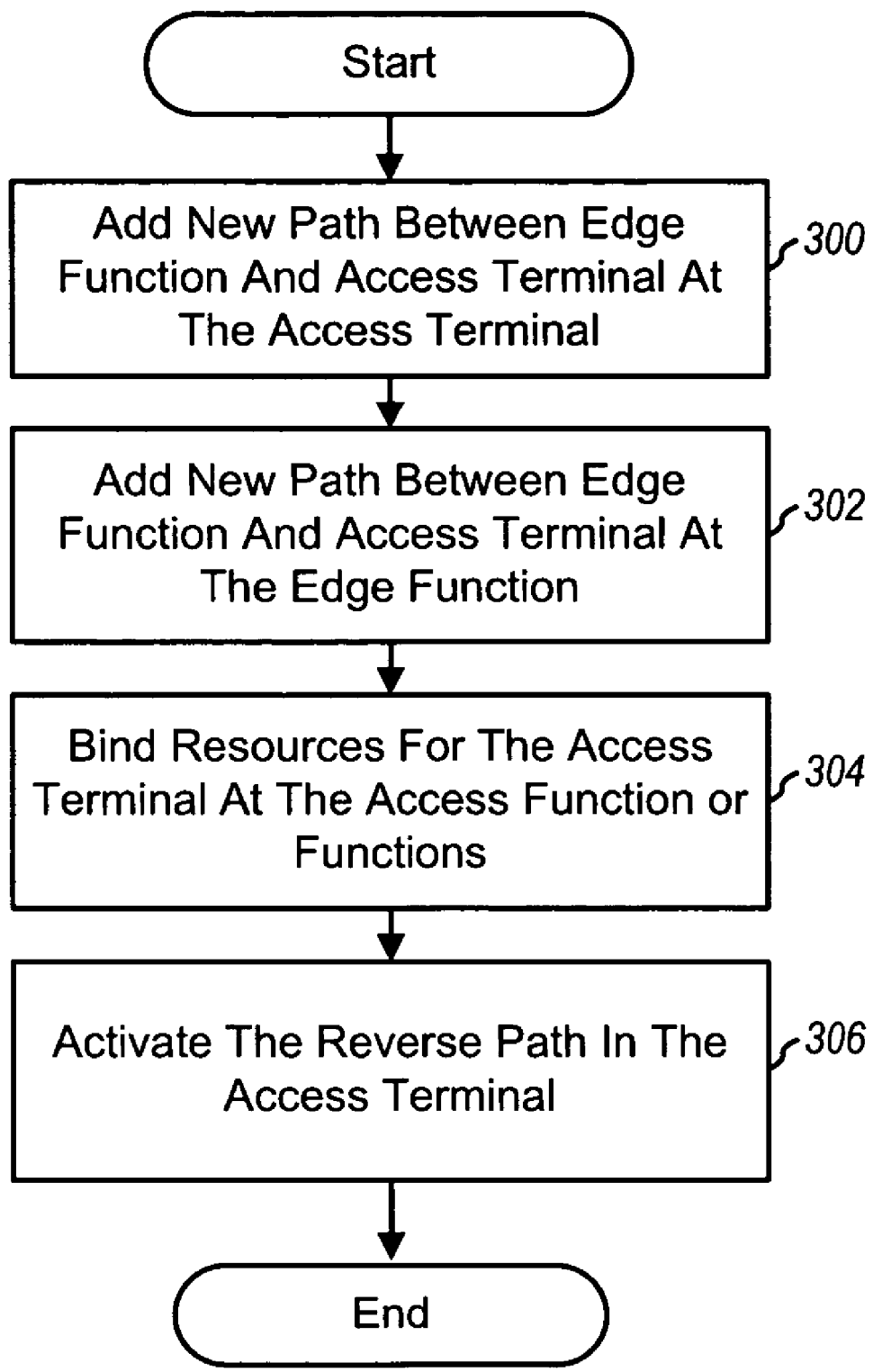
FIG. 5 illustrates an operational flow of adding a communication path according to an embodiment.

Referring to FIG. 5, an operational flow of adding a link layer path according to an embodiment is illustrated. A new RLP instance is created at the access terminal, block 300. The new RLP instance includes the information needed for communication between the access terminal and the new edge function, e.g. route identifier information for the new edge function. A new communication path is formed at the edge function for transmitting packets between the network and the new edge function, block 302. The ordering of blocks 300 and 302 is arbitrary. The new communication path, formed at the RLP, includes resources to allow transmission of packets between the network and new edge function, including adding the route identifier associated with the new edge function to packets that are destined for the access terminal. In one embodiment the new RLP instance will be the same as the old RLP instance after a reset or initialization, for example, all the attributes associated with QoS and header compression are the same, but the state of the header compressor and buffers are initialized.

The access function then binds its resources, e.g. associates communication parameters and memory, to create a new communication instance with the access terminal, block 304. The resources are generally buffer resources and communication information. The access terminal can then, once the communication path has been established through the edge function, the access function, and the network, establish a reverse link communication path to the new access function, block 306.

Figure 6:
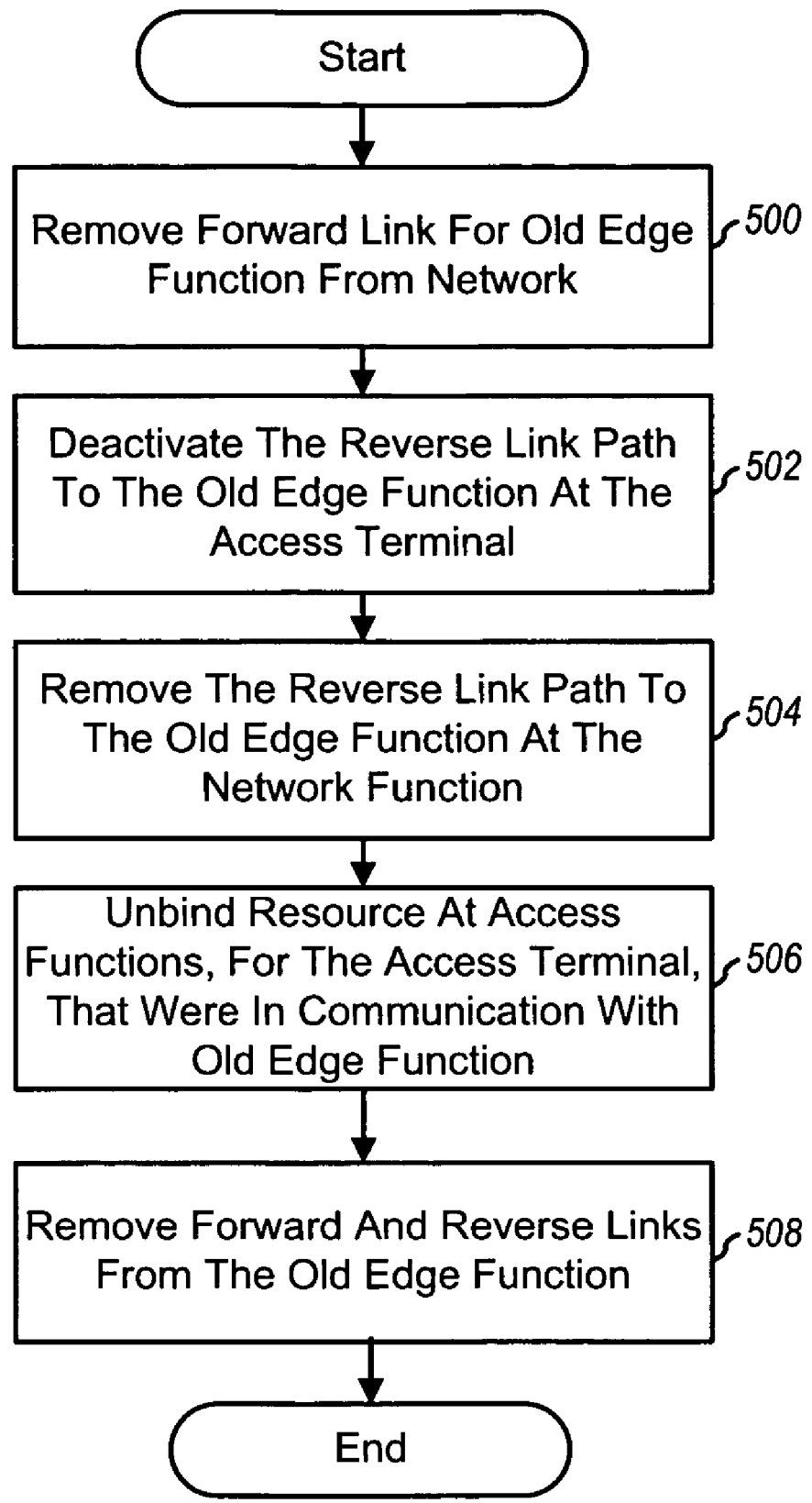
FIG. 6 illustrates an operational flow of removing a link layer path according to an embodiment.

Referring to FIG. 6, an operational flow of removing a link layer path according to an embodiment is illustrated. The old edge function removes forward link information, i.e. for transmission to the access terminal, block 500. The access terminal deactivates the reverse link path so that no more packets are sent on this reverse link path until it is reactivated, block 502. The reverse link path between the old edge function and the network function is then removed, block 504. The resources, at the access functions that are in communication with the old edge function, are removed, block 506. Finally, all the reverse link and forward link information at the old edge function is deleted from memory, block 508. Any information and resources at the access terminal for communication with the old edge function may also be removed.

Referring to FIG. 7, message flow for a packet based hand-off according to an embodiment is illustrated. An access terminal (AT) is in communication with access function 1 (AF1). During regular intervals, the AT transmits channel quality information (CQI) to AF1. AF1 receives packets, intended for over the air transmission to AT, from an edge function (EF) that is in communication with a packet network. EF inserts route identifiers into packets it receives that are intended for AF1 to transmit to AT. The route identifiers may identify the EF, AF1, AT, or any combination of these in order to facilitate reassembly, header decompression, and other functionality by the AT upon receipt of the frames constructed from the packets, or information contained in the packets.

AF1 then transmits the data packets, or portion thereof, to AT via a wireless link. AT transmits additional CQI information, which may be a regularly scheduled transmission or be transmitted based upon a request from AF1. Based upon the CQI, AF1 can make a decision to hand-off a source of wireless link to another access function, e.g. AF2. Alternatively, if multiple access functions have allocated resources for a given access terminal, the CQI values are reported from all the of the access functions allocating resources along with an indication of which is the desired access function for the access terminal. Then the handoff decision can be made between the access functions that provide the information to the edge function or at the edge function that is in communication with the access functions, e.g., the RNC or BSC. For example, AF2 may send a request to AF1 and the EF for a handoff based on the CQI information it receives from the AT.

In response to the AT CQI request to AF2, AF2 transmits a request to become the new serving access function to both AF1 and EF. AF1 then sends a message that updates the radio link protocol (RLP) parameters to AF2. In some embodiments, AF1 may provide only state information of the buffers without providing the actual contents of the buffers to AF2.

Data packets are then transmitted from the EF to both AF1 and AF2, which both transmit packets to, and receive packets from, the AT. In another embodiment, EF transmits packets to only one of AF1 or AF2, and when a handoff occurs from AF1 to AF2, the EF no longer forwards packets to AF1. Since, a hand-off has occurred to AF2, CQI is transmitted by the AT to AF2. After a period of time or the occurrence of some parameters, AF1 sends a request to no longer receive data to be transmitted to it from EF. After transmission of this request, the EF no longer sends data packets to AF1, but sends all the packets to AF2 that are destined for the AT. In another embodiment, the AT sends CQI to AF1, AF2, and all access functions allocating resources to the AT. The CQI may indicate the preferred serving AF with the AT.

In order to continue uninterrupted data transmission, the new access function, e.g. AF2, needs to know the RLP state information for the forward link, where the state information may be all the data in the packet buffer, the memory allocated for packets or frames received at the access function, and the retransmit buffer, memory allocated for packets for which retransmission is required, e.g. no acknowledgement for the packet was received from the AT, as well as any data that has not yet been transmitted in a transmit buffer, the memory allocated for packets or frames to be transmitted from the access function. The old access function, e.g. AF1, maintains its transmitted segment buffer for a predetermined period of time after the request to hand-off to another access function.

In one embodiment, timers at the access function and access terminal are reset to default values upon a hand-off request. This may facilitate flushing of the buffers and resetting of abort timers which may be dependent on the packet inter-arrival time and scheduling time.

After hand-off, the new access function behaves like the RLP source, including responding to acknowledgements or negative acknowledgements received from the access terminal for which the data was not received from the access function.

If the AT is capable of receiving from two AF's simultaneously, the AT can decode both frames and use the received data to update its resequencing buffer at the receiver. When multiple AF's transmit frames simultaneously, the send state information can be updated at each transmitting access function for the access terminal based on its current local state. In the case of multiple simultaneous transmitting access functions, the main access function, i.e. the one to which the hand-off is occurring, send to the other access functions to update the local RLP states. In another embodiment, the edge function controls the RLP state at each AF transmitting simultaneously.

While FIG. 7, indicates that the AT decides when to hand-off to another access function, other embodiments may have the access function, e.g. AF1 or EF decide when to issue a request to hand-off. In these cases, the access function may decide to hand-off to another access function based upon not only CQI information, but also scheduling issues, system loading information, the location of the access terminal, a predetermined time period, or other parameters.

Figure 8A:
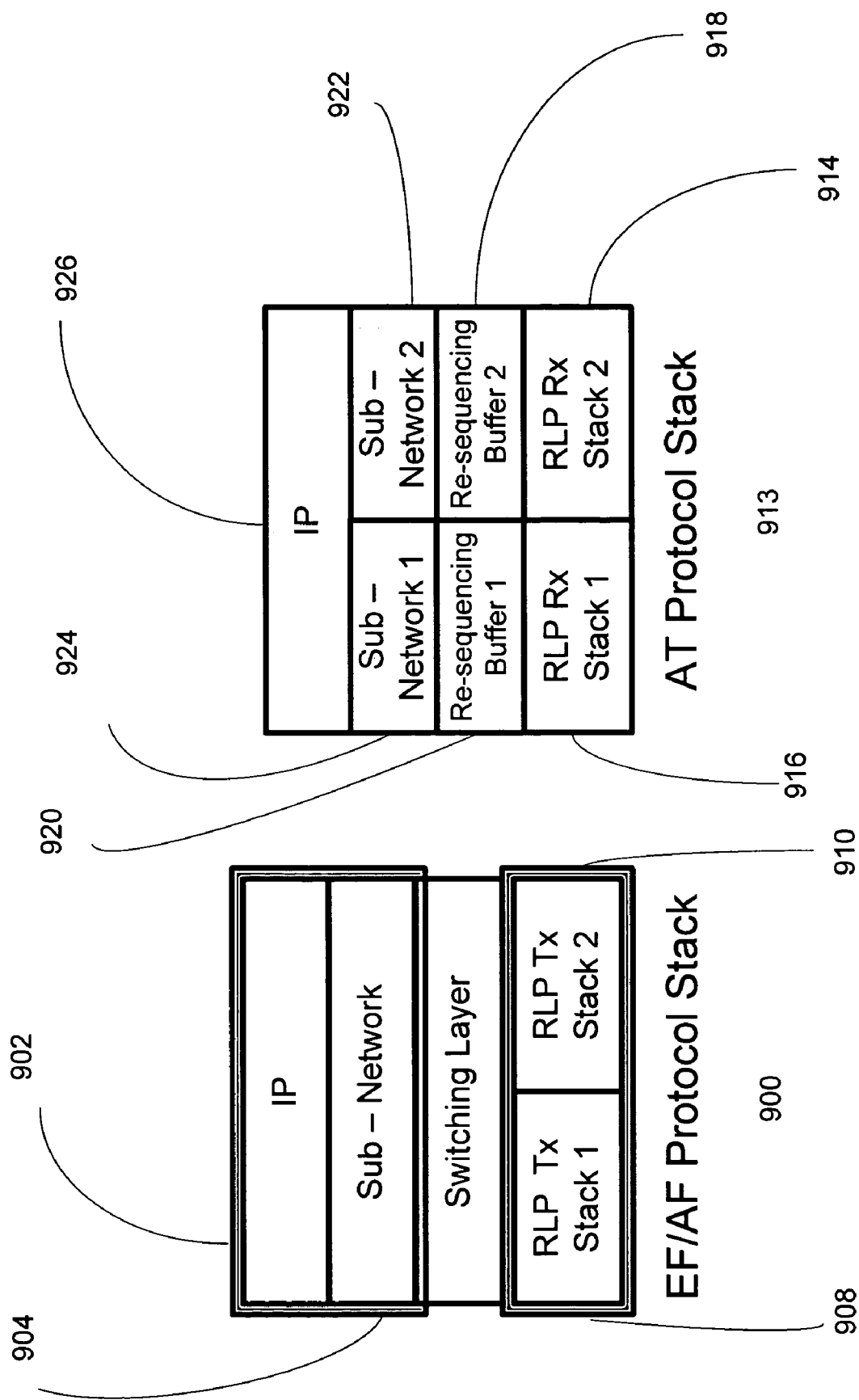
FIG. 8A illustrates a protocol stack for a forward link according to an embodiment.

Referring to FIG. 8A, a protocol stack for a forward link according to an embodiment is illustrated. As used herein, the forward link refers to transmission from access function to the access terminal. For the access function protocol stack 900, the edge function and access function are shown, and may reside on a same access functions or at different access functions. In the embodiment depicted in FIG. 8A, an RLP instance 908 and another RLP instance 910 exist at a single access function communicating over a wireless link with an access terminal. Each of the RLP instances 908 and 910 has a different associated route identifier.

On the forward link, the edge function providing the access function receives packets from the home agent via the network layer, here the internet protocol (IP) layer 902. The sub-network layer 904 provides header compression for the edge function. The received packets are processed in the switching layer 906, which passes the packets for forwarding to the appropriate RLP instance 908 and 910 on the appropriate access function. In an embodiment, the switching layer 906 provides a tunnel to all access functions that may be identified by a route identifier by edge function. The RLP instance 908 or 910 at the access function then processes and transmits the packets over a wireless interface to the access terminal.

At access terminal stack 913, frames are processed after receipt on wireless link by radio link protocol layers 914 and 916 according to the route identifier contained in the frame. The frames are then re-sequenced for each identifier according to the sequence numbers assigned to a frame, while separating frames having different route identifiers. The frames are reassembled by re-sequencing buffers 920 and 918 for those frames that were processed by the appropriate radio link protocol layers 914 and 916. The reassembled packets are then processed by sub-network layers 924 and 922 for the appropriate re-sequencing buffer. The sub-network layers 924 and 922 perform header decompression for the packets compressed by sub-network layer 904. Both 922 and 924 then provide the packets to the internet protocol layer 926, or other network layer.

Figure 8B:
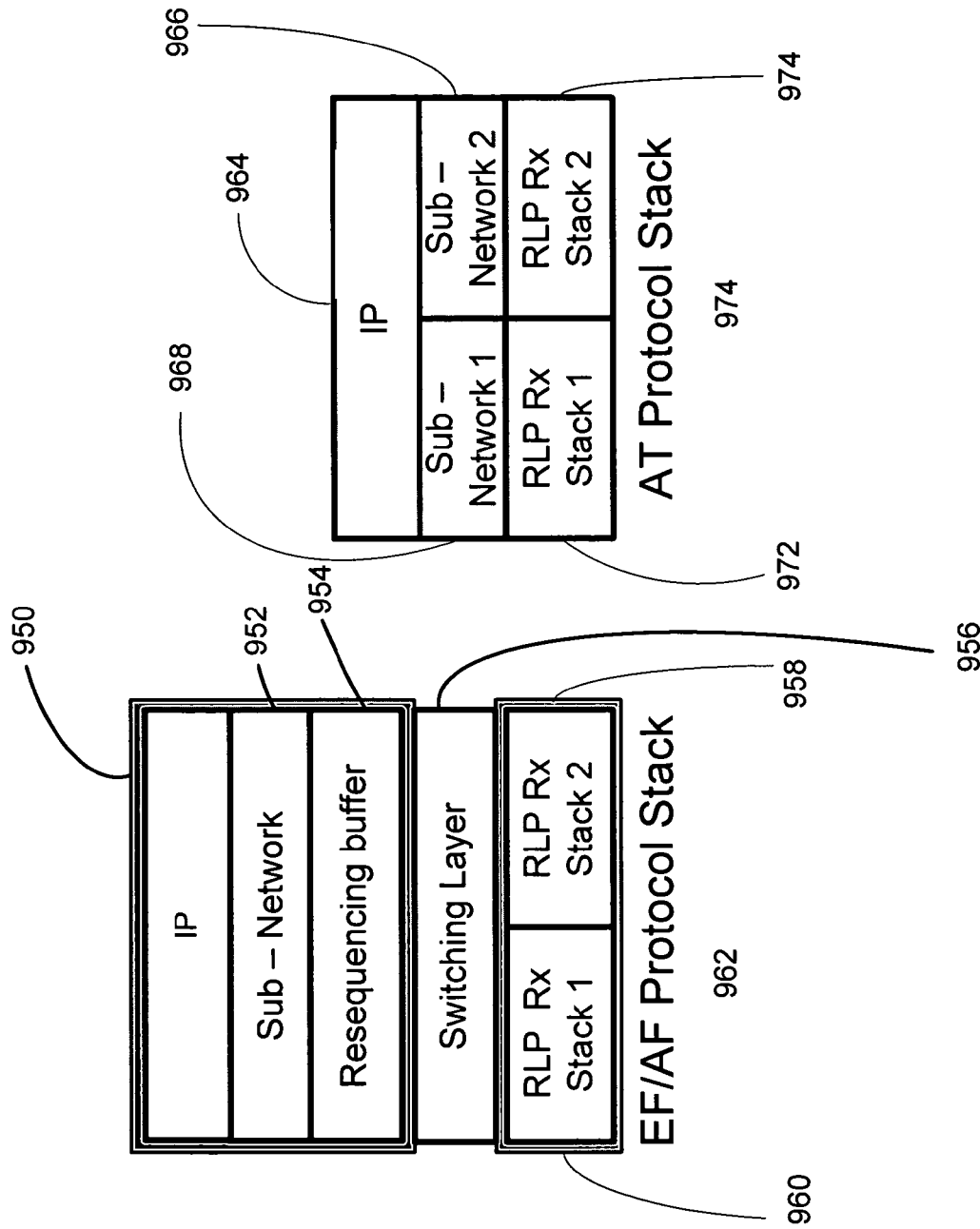
FIG. 8B illustrates a protocol stack for a reverse link according to an embodiment.

Referring to FIG. 8B, a protocol stack for a reverse link according to an embodiment is illustrated. As used herein, the reverse link refers to transmission to the access function from the access terminal. Access terminal stack 974 includes internet protocol layer 964 which forms network packets, here internet packets, for transmission via a specific network protocol. Sub-network layers 966 and 968 provide header compression for the packets. Each packet is sent via exactly one of sub-network layers 966 and 968 which are identified according to the route identifier contained in the frame sent over the air. Each sub-network layer 966 and 968 provides header compression for frames that are to be transmitted by the appropriate RLP instance 972 and 974.

At an access function 962, the frames are then received at two different RLP stacks 958 and 960 according to the route identifier contained in the frame. Frames received at the RLP stacks 958 and 960 are then transmitted by switching layer 956 to a resequencing buffer 954. The switching layer 956 selects the resequencing buffer to forward the packets according to the route identifier. The resequencing buffer 954 may be part of one of the access functions, or may be part of an edge function that communicates packets to and from a network for access terminal that contains access terminal stack 974. In one embodiment, the resequencing buffer 954 is part of the edge function, and each active edge function has a separate resequencing buffer. In this embodiment, the route identifier indicates which resequencing buffer to forward the frame received over the air. Sub-network layer 952 decompresses the header of the packets for transmission via the network by network layer 950, which in this case is an internet protocol layer.

In the embodiment of FIGS. 8A and 8B, the access functions, each allocate Medium Access Control (MAC) layer resources to an access terminal, when any one of them is in communication with the access terminal over a wireless link, to allow for decoupled hand-off between the access functions. Further, an access function may contain both edge functions and access functions. In such embodiments, any access function that allocates MAC resources to a particular access terminal can serve as either or both the edge function that communicates with network, for packets destined for access terminal, and the access function that communicates with access terminal over an air interface. This allows for efficient handoff, which is independent between the edge functions, access functions, or network functions. Further, each of these hand-offs appears transparent to the access terminal.

Figure 9:
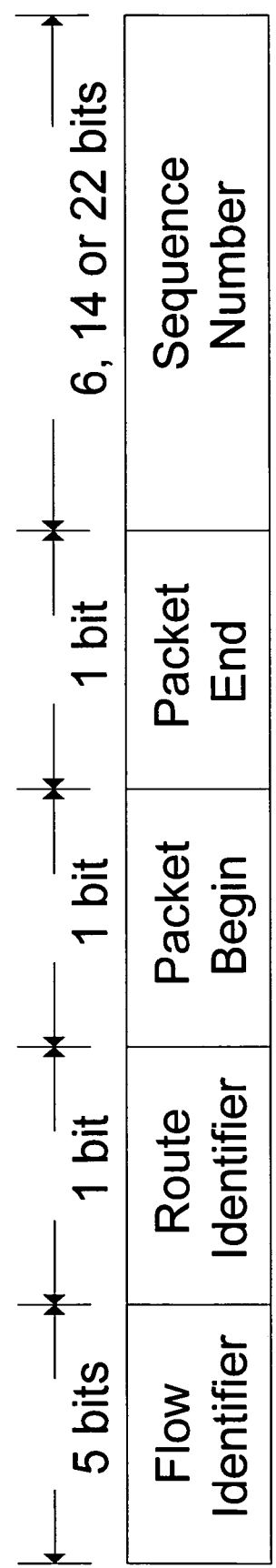
FIG. 9 illustrates a portion of a packet header according to an embodiment.

Referring to FIG. 9, a portion of a packet header according to an embodiment is illustrated. A flow identifier may be used to provide multiple independent RLP flows for a single access terminal. For instance, multiple flows may be used to distinguish between different applications for Quality of Service purposes. A route identifier provides information as to the over the air transmission source or destination that transmits the packets to and receives the packets from the access terminal respectively. While FIG. 9 depicts the route identifier portion of the packet header as being one bit, it may also be two or more bits. In an embodiment, it may be between four and eight bits.

Packet end and packet begin bits provide the beginning and end bits of the packet payload. The packet end bit is set to one if the end of the packet is a part of the packet payload. Otherwise, the packet end bit is set to zero. The packet start bit is set to one if the start of the packet is a part of the packet payload. Otherwise, the packet start bit is set to zero. Only one packet can be sent in a packet payload, but multiple packet payloads may be sent in a single over the air transmission. The sequence number depicts the sequence of the packets for reassembly at the access terminal or edge function.

As previously discussed, the route identifier may be used by the access terminal for proper processing. In some embodiments, processing may include packet fragmentation and reassembly or header compression and decompression.

A packet sequence space of SequenceLength bits may be utilized for the sequence number field.

The value of the route identifier is changed when a new protocol stack, FIGS. 8A and 8B, is created in response to a switching request. Packets entering a given edge function all receive the same value of a route identifier for the lifetime of that communication instance for the particular access terminal.

Figure 10:
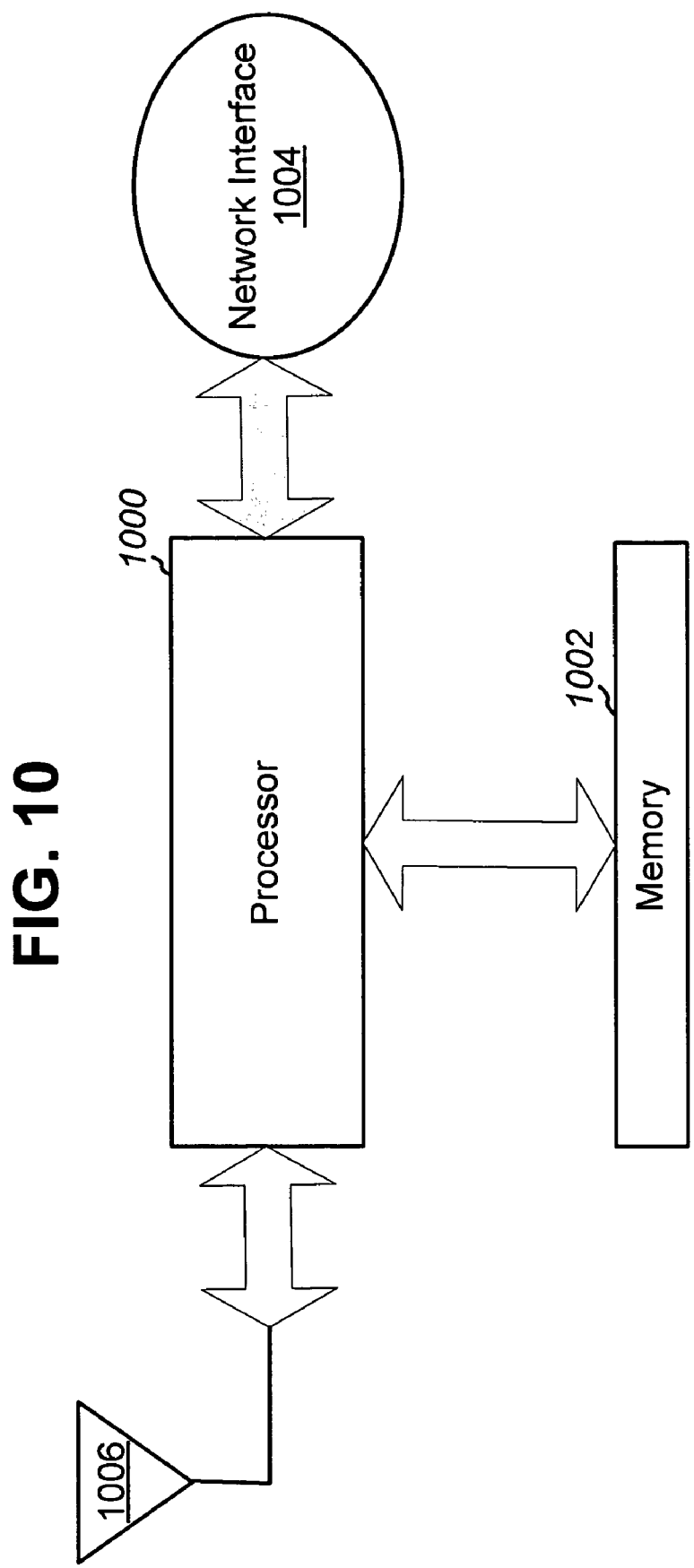
FIG. 10 illustrates a block diagram of an access function according to an embodiment.

Referring to FIG. 10, a block diagram of an access function according to an embodiment is illustrated. A processor 1000 is coupled with a memory 1002, network interface 1004, and antenna 1006. Network interface 1004 is coupled to a network that is coupled to cause packets or frames to be transmitted to and from the edge function of the access function. The packets or frames may be destined for an access terminal, with or without a route identifier depending on their transmission source, or for the access function itself. The processor can append to or insert into the received packets or frames both the route identifiers and sequence numbers. The processor can then store the packets or frames in memory 1002 for transmission to the access terminal via antenna 1006. Also, if the route identifiers identify other access terminals, the edge function may transmit the packets or frames that include the route identifier to the appropriate access terminal via network interface 1004 to the appropriate access function.

In other embodiments, an access function may serve as both an access function and an edge function. Further, if an edge function does not include access functionality in a same device, edge function may comprise one or more processors, one or more memories, and one or more network interfaces as described with respect to FIG. 10.

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communication providing for packet based handoffs between access functions in a wireless network, comprising:
    processing a frame for transmission in the wireless network, the frame including portions that each identify at least one function in a transmission route of the frame; wherein the frame is an internet protocol packet having an internet header portion; and
    transmitting by an electronic hardware the frame based on the transmission route of the frame;
    wherein the portions identify an access function that is transmitting the frame over the air, an edge function that is transmitting the frame to the access function, and a network function that transmits the frame to the edge function; whereby the portions define the transmission route such that a handoff between access functions can be performed.

2. The method of claim 1, wherein the portion that identifies at least one function in the transmission route consists of at least four bits and no more than 8 bits.

3. The method of claim 1, wherein the portion that identifies at least one function in the transmission route comprises RLP identification.

4. The method of claim 1, wherein the frame comprises an integer number of octets.

5. An apparatus for communication providing for packet based handoffs between access functions in a wireless network, comprising:
    means for processing a frame for transmission in the wireless network, the frame including portions that each identify at least one function in a transmission route of the frame; wherein the frame is an internet protocol packet having an internet header portion; and
    means for physically transmitting the frame based on the transmission route of the frame;
    wherein the portions identify an access function that is transmitting the frame over the air, an edge function that is transmitting the frame to the access function, and a network function that transmits the frame to the edge function; whereby the portions define the transmission route such that a handoff between access functions can be performed.

6. An apparatus for communication providing for packet based handoffs between access functions in a wireless network, comprising:
    a processor configured to process a frame for transmission in the wireless network, the frame including portions that each identify at least one function in a transmission route of the frame; wherein the frame is an internet protocol packet having an internet header portion, and to transmit the frame based on the transmission route of the frame; and
    a memory coupled to the processor for storage of the frame;
    wherein the portions identify an access function that is transmitting the frame over the air, an edge function that is physically transmitting the frame to the access function, and a network function that transmits the frame to the edge function; whereby the portions define the transmission route such that a handoff between access functions can be performed.

7. The Apparatus of claim 5, wherein the portion that identifies at least one function in the transmission route consists of at least four bits and no more than 8 bits.

8. The Apparatus of claim 5, wherein the portion that identifies at least one function in the transmission route comprises RLP identification.

9. The Apparatus of claim 5, wherein the frame comprises an integer number of octets.

10. The Apparatus of claim 6, wherein the portion that identifies at least one function in the transmission route consists of at least four bits and no more than 8 bits.

11. The Apparatus of claim 6, wherein the portion that identifies at least one function in the transmission route comprises RLP identification.

12. The Apparatus of claim 6, wherein the frame comprises an integer number of octets.

* * * * *